US012745215B2

(12) United States Patent
Schliwa-Bertling et al.

(10) Patent No.: US 12,745,215 B2
(45) Date of Patent: Sep. 22, 2026

(54) INTER-FREQUENCY RE-DIRECTION VIA PAGING

(71) Applicant: Telefonaktiebolaget LM Ericsson (publ), Stockholm (SE)

(72) Inventors: Paul Schliwa-Bertling, Ljungsbro (SE); Pradeepa Ramachandra, Linköping (SE); Christofer Lindheimer, Vadstena (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 355 days.

(21) Appl. No.: 17/802,316

(22) PCT Filed: Mar. 31, 2021

(86) PCT No.: PCT/SE2021/050293

§ 371 (c)(1),
(2) Date: Aug. 25, 2022

(87) PCT Pub. No.: WO2021/201761

PCT Pub. Date: Oct. 7, 2021

(65) Prior Publication Data

US 2023/0100843 A1 Mar. 30, 2023

Related U.S. Application Data

(60) Provisional application No. 63/002,643, filed on Mar. 31, 2020.

(51) Int. Cl.
*H04W 68/02* (2009.01)
*H04W 36/06* (2009.01)
(Continued)

(52) U.S. Cl.
CPC .......... *H04W 68/02* (2013.01); *H04W 36/06* (2013.01); *H04W 72/0453* (2013.01); *H04W 76/10* (2018.02)

(58) Field of Classification Search
CPC . H04W 68/02; H04W 36/06; H04W 72/0453; H04W 76/10; H04W 68/00; Y02D 30/70
See application file for complete search history.

(56) References Cited

U.S. PATENT DOCUMENTS

2018/0249441 A1* 8/2018 Ryoo .................... H04W 48/16
2021/0014781 A1* 1/2021 Ianev .................... H04W 48/18
(Continued)

FOREIGN PATENT DOCUMENTS

EP 3440889 B1 * 8/2023 ........ H04W 74/0833

OTHER PUBLICATIONS

International Search Report and Written Opinion dated Jul. 7, 2021 for International Application No. PCT/SE2021/050293 filed Mar. 31, 2021; consisting of 8 pages.
(Continued)

*Primary Examiner* — Justin T Van Roie
(74) *Attorney, Agent, or Firm* — Weisberg I.P. Law, P.A.

(57) ABSTRACT

A method, network node and user equipment (UE) for inter-frequency redirection via paging are disclosed. According to one aspect, a method in the UE includes receiving a paging message from the network node on a first frequency, the paging message directing the UE to switch from the first frequency to a second frequency, the first frequency being associated with a first slice and the second frequency being associated with a second slice; and performing one of a radio resource control, RRC, resume and an RRC setup procedure on the second frequency. According to another aspect, a method in a network node include generating and sending the paging message.

10 Claims, 15 Drawing Sheets

(51) Int. Cl.
*H04W 72/0453* (2023.01)
*H04W 76/10* (2018.01)

(56) References Cited

U.S. PATENT DOCUMENTS

2021/0105633 A1* 4/2021 Vaidya .................. H04W 76/27
2021/0352619 A1* 11/2021 Ryu .................... H04W 68/005

OTHER PUBLICATIONS

3GPP TSG-RAN meeting #86 RP-192599; Title: Second round email discussion for R17 proposals on slicing; Agenda Item: 9.1.2; Source: CMCC; Document for: Discussion and Decision; Date and Location: Dec. 9-12, 2019, Sitges, Barcelona; consisting of 32 pages.
3GPP TS 38.423 V15.5.0; 3rd Generation Partnership Project; Technical Specification Group Radio Access Network; NG-RAN; Xn application protocol (XnAP) (Release 15); Sep. 2019; consisting of 311 pages.
3GPP TS 38.413 V15.5.0; 3rd Generation Partnership Project; Technical Specification Group Radio Access Network; NG-RAN; NG Application Protocol (NGAP) (Release 15); Sep. 2019; consisting of 329 pages.
3GPP TS 38.331 V15.8.0; 3rd Generation Partnership Project; Technical Specification Group Radio Access Network; NR; Radio Resource Control (RRC) protocol specification (Release 15); Dec. 2019; consisting of 532 pages.
3GPP TS 38.304 V15.2.0; 3rd Generation Partnership Project; Technical Specification Group Radio Access Network; NR; User Equipment (UE) procedures in Idle mode and RRC Inactive state (Release 15); Dec. 2018; consisting of 28 pages.
3GPP TS 38.300 V15.7.0; 3rd Generation Partnership Project; Technical Specification Group Radio Access Network; NR; NR and NG-RAN Overall Description; Stage 2 (Release 15); Sep. 2019; consisting of 99 pages.
3GPP TS 38.213 V15.7.0; 3rd Generation Partnership Project; Technical Specification Group Radio Access Network; NR; Physical layer procedures for control (Release 15); Sep. 2019; consisting of 108 pages.
3GPP TS 38.133 V15.8.0; 3rd Generation Partnership Project; Technical Specification Group Radio Access Network; NR; Requirements for support of radio resource management (Release 15); Dec. 2019; consisting of 1121 pages.
3GPP TS 23.501 V15.8.0; 3rd Generation Partnership Project; Technical Specification Group Services and System Aspects; System architecture for the 5G System (5GS); Stage 2 (Release 15); Dec. 2019; consisting of 248 pages.
3GPP TS 23.122 V15.7.0; 3rd Generation Partnership Project; Technical Specification Group Core Network and Terminals; Non-Access-Stratum (NAS) functions related to Mobile Station (MS) in idle mode (Release 15); Mar. 2019; consisting of 65 pages.
3GPP TS 24.501 V15.6.0; Non-Access-Stratum (NAS) protocol for 5G System (5GS); Stage 3 (Release 15); Dec. 2019; consisting of 506 pages.

* cited by examiner

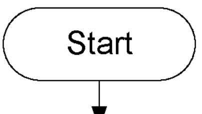
Generate A Paging Message, The Paging Message Directing The UE To Switch From A First Frequency To A Second Frequency On Which To Perform One Of A Radio Resource Control, RRC, Resume And An RRC Setup Procedure, The First Frequency Being Associated With A First Slice And The Second Frequency Being Associated With A Second Slice
S142
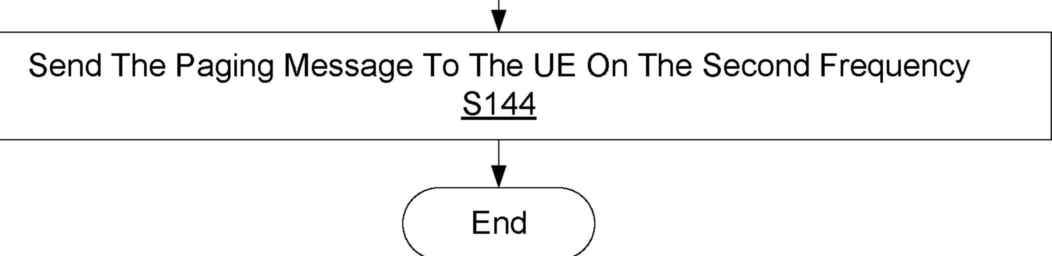
FIG. 10

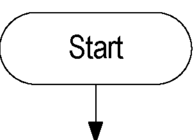

Receive A Paging Message From The Network Node On A First Frequency, The Paging Message Directing The UE To Switch From The First Frequency To A Second Frequency, The First Frequency Being Associated With A First Slice And The Second Frequency Being Associated With A Second Slice
S146

Perform One Of A Radio Resource Control, RRC, Resume And An RRC Setup Procedure On The Second Frequency
S148

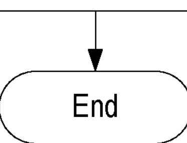

FIG. 11

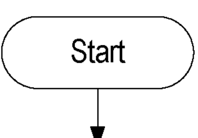

Indicate To A First Network Node To Generate A Paging Message, The Paging Message Directing A User Equipment, UE, To Switch From A First Frequency To A Second Frequency On Which To Perform One Of A Radio Resource Control, RRC, Resume And An RRC Setup Procedure, The First Frequency Being Associated With A First Slice And The Second Frequency Being Associated With A Second Slice
S150

Forward A Slice Specific Data Associated With The UE To A Second Network Node, The Second Slice Being Served By The Second Network Node And The First Slice Being Served By The First Network Node
S152

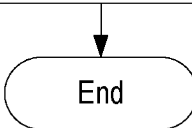

FIG. 12

INTER-FREQUENCY RE-DIRECTION VIA PAGING

CROSS-REFERENCE TO RELATED APPLICATIONS

This application is a Submission Under 35 U.S.C. § 371 for U.S. National Stage Patent Application of International Application No.: PCT/SE2021/050293, filed Mar. 31, 2021 entitled "INTER-FREQUENCY RE-DIRECTION VIA PAGING," which claims priority to U.S. Provisional Application No.: 63/002,643, filed Mar. 31, 2020, entitled "INTER-FREQUENCY RE-DIRECTION VIA PAGING," the entireties of both of which are incorporated herein by reference.

FIELD

The present disclosure relates to wireless communications, and in particular, to inter-frequency redirection via paging.

BACKGROUND

Inter-Frequency Cell Reselection

In a wireless communication system, when the user equipment (UE) is in Idle/Active state, the UE performs the cell selection and re-selection procedures. The cell reselection procedure allows the UE to select a more suitable cell and camp on it. The dormant state may be defined for 3rd Generation Partnership Project (3GPP) standards based networks, such as those based on Long Term Evolution (LTE) and New Radio (NR) (NR is also referred to as "5G") wireless communication systems as LTE/NR IDLE, LTE IDLE with suspended, LTE/NR INACTIVE.

The UE in the dormant state measures signal strength and signal quality of neighboring cells on the current frequency and any inter-frequency carriers. Measurements on cells on inter-frequency carriers and cells on inter-radio access technology (RAT) frequencies with higher cell reselection priority than the current frequency are always performed. The priorities can either be broadcast or sent specifically to the UE when it is released to idle mode.

The cell (re)selected by the UE in a dormant state is also called a camping cell and that is the cell where the UE connects when it has data to send and the cell that the UE will monitor for paging. In case the network has data to transmit to the UE, the network will page the UE in order to reach the UE, and in response to the paging, the UE will initiate the procedure to establish the connection. Once the UE has an active connection, additional resources can be setup. Such additional resources can be set up through additional cells using techniques such as Dual Connectivity and/or Carrier Aggregation to increase throughput.

In 3GPP LTE Release 13 (Rel-13), a mechanism was introduced for the UE to be suspended by the network in a suspended state similar to RRC_IDLE but with the difference that the UE stores the Access Stratum (AS) context or radio resource control (RRC) context. This makes it possible to reduce the signaling when the UE is becoming active again by resuming the RRC connection. This is done instead of establishment of the RRC connection from scratch. Reducing the signaling could have several benefits, such as:

- Reduce latency, e.g., for smart phones accessing the Internet; and/or
- Reduced signaling leads to reduce battery consumption for machine type devices sending very little data.

In NR, a new RRC_INACTIVE state was introduced to reduce the signaling overhead over the radio and network interfaces and to improve the UE access latency as well as UE energy consumption. In this state, the Core Network (CN) still regards the UE as connected and the CN-radio access network (RAN) connection is kept active, even though the RRC connection between the RAN and the UE is suspended. In order to reduce radio interface signaling at connection establishment, context information is kept active in the UE and in the RAN, which enables the UE to resume its RRC connection when it is paged or has uplink (UL) data or signaling to send.

In all these suspended states, the UE performs a cell reselection procedure for mobility purposes in a manner that is similar to the procedure for idle mode, i.e., using priority settings that are either received through broadcast or through dedicated signaling. Based on the received priority settings, the UE performs measurements on cells and/or frequencies (including intra- and inter-RAT measurements) in order to determine what cell to camp on.

Cell reselection can be intra-frequency, inter-frequency or inter-RAT. The primary purpose of cell reselection is to ensure that the UE camps on the best cell in terms of radio conditions so that it will get the best service/throughput when the UE is connecting and is connected.

The UE measures some attributes of the serving and neighbor cells to enable the reselection process. For intra-frequency measurements, the UE is able to detect and measure neighbor cells. For inter-frequency neighbor cells, the UE can be told by a network node which carrier frequencies to measure. If the serving cell fulfills particular search and/or measurement criteria, then measurements for cell re-selection may be avoided, provided that the serving cell attributes fulfill particular search or measurement criteria.

An example of the cell reselection process is shown in FIG. 1, which may be considered a type of state diagram and may include one or more of:

1: when anew PLMN is being selected by the UE:
- when cell information is stored for the PLMN, Ta: use the stored information for cell selection;
- when cell information is not stored for the PLMN, 1*b*: perform an initial cell selection;

2: when a suitable cell is found the UE may camp normally. In such state:
- upon a trigger, 2*a*: perform cell reselection evaluation process;
- when idle/inactive mode is left, 2*b*: UE enters connected mode;
- when the UE returns to idle/inactive mode, 2*c*: cell selection may be performed upon leaving connected mode;
- when no suitable cell is found, 2*d*: the UE may perform any cell selection;

3: when no suitable cell is found, the UE 22 is considered camped on any cell.

In such state:
- upon a trigger, 3*a*: UE may perform a cell reselection evaluation process;
- upon leaving idle mode, 3*b*: UE may enter connected mode (Emergency calls only); and
- when the UE returns to idle mode, 3*c*: the UE may perform cell selection when leaving connected mode.

The Third Generation Partnership Project (3GPP) Technical Standard (TS) 38.304, and some excerpts from TS 38.304 about the cell reselection process are given as well:

Cell Reselection evaluation process 5.2.4.1 Reselection priorities handling

Absolute priorities of different NR frequencies or inter-RAT frequencies may be provided to the UE in the system information, in the RRCRelease message, or by inheriting from another RAT at inter-RAT cell (re) selection. In the case of system information, an NR frequency or inter-RAT frequency may be listed without providing a priority (i.e., the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling and deprioritisationReq received in RRCRelease unless specified otherwise. When the UE in camped normally state, has only dedicated priorities other than for the current frequency, the UE shall consider the current frequency to be the lowest priority frequency (i.e., lower than any of the network configured values).

The UE shall only perform cell reselection evaluation for NR frequencies and inter-RAT frequencies that are given in system information and for which the UE has a priority provided.

In case UE receives RRCRelease with deprioritisationReq, UE shall consider current frequency and stored frequencies due to the previously received RRCRelease with deprioritisationReq or all the frequencies of NR to be the lowest priority frequency (i.e., lower than any of the network configured values) while T325 is running irrespective of camped RAT. The UE shall delete the stored deprioritization request(s) when a PLMN selection is performed on request by NAS (TS 23.122).

NOTE: UE should search for a higher priority layer for cell reselection as soon as possible after the change of priority. The minimum related performance requirements specified in TS 38.133 are still applicable.

Following rules are used by the UE to limit needed measurements:

If the serving cell fulfils Srxlev>SIntraSearchP and Squal>SIntraSearchQ, the UE may choose not to perform intra-frequency measurements.

Otherwise, the UE shall perform intra-frequency measurements.

The UE shall apply the following rules for NR inter-frequencies and inter-RAT frequencies which are indicated in system information and for which the UE has priority provided:

For a NR inter-frequency or inter-RAT frequency with a reselection priority higher than the reselection priority of the current NR frequency, the UE shall perform measurements of higher priority NR inter-frequency or inter-RAT frequencies according to TS 38.133.

For a NR inter-frequency with an equal or lower reselection priority than the reselection priority of the current NR frequency and for inter-RAT frequency with lower reselection priority than the reselection priority of the current NR frequency:

If the serving cell fulfils Srxlev>SnonIntraSearchP and Squal>SnonIntraSearchQ, the UE may choose not to perform measurements of NR inter-frequencies or inter-RAT frequency cells of equal or lower priority;

Otherwise, the UE shall perform measurements of NR inter-frequencies or inter-RAT frequency cells of equal or lower priority according to TS 38.133.

5.2.4.5 NR Inter-frequency and inter-RAT Cell Reselection criteria

If threshServingLowQ is broadcast in system information and more than 1 second has elapsed since the UE camped on the current serving cell, cell reselection to a cell on a higher priority NR frequency or inter-RAT frequency than the serving frequency shall be performed if A cell of a higher priority NR or EUTRAN RAT/frequency fulfils Squal>ThreshX, HighQ during a time interval TreselectionRAT Otherwise, cell reselection to a cell on a higher priority NR frequency or inter-RAT frequency than the serving frequency shall be performed if:

A cell of a higher priority RAT/frequency fulfils Srxlev>ThreshX, HighP during a time interval TreselectionRAT; and More than 1 second has elapsed since the UE camped on the current serving cell.

Cell reselection to a cell on an equal priority NR frequency shall be based on ranking for intra-frequency cell reselection.

If threshServingLowQ is broadcast in system information and more than 1 second has elapsed since the UE camped on the current serving cell, cell reselection to a cell on a lower priority NR frequency or inter-RAT frequency than the serving frequency shall be performed if:

The serving cell fulfils Squal<$Thresh_{Serving,\ LowQ}$ and a cell of a lower priority NR or E-UTRAN RAT/frequency fulfils Squal>$Thresh_{X,\ LowQ}$ during a time interval $Treselection_{RAT}$.

Otherwise, cell reselection to a cell on a lower priority NR frequency or inter-RAT frequency than the serving frequency shall be performed if:

The serving cell fulfils Srxlev<$Thresh_{Serving,\ LowP}$ and a cell of a lower priority RAT/frequency fulfils Srxlev>$Thresh_{X,\ LowP}$ during a time interval $Treselection_{RAT}$; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:

If the highest-priority frequency is an NR frequency, the highest ranked cell among the cells on the highest priority frequency(ies) meeting the criteria;

If the highest-priority frequency is from another RAT, the highest ranked cell among the cells on the highest priority frequency(ies) meeting the criteria of that RAT.

5.2.4.6 Intra-frequency and equal priority inter-frequency Cell Reselection criteria The cell-ranking criterion $R_s$ for serving cell and $R_n$ for neighbouring cells is defined by:

$$R_s=Q_{meas,s}+Q_{hyst}-QOffSet_{temp}$$

$$R_n=Q_{meas,n}-Qoffset-Qoffset_{temp}$$

where:

| | |
|---|---|
| $Q_{meas}$ | RSRP measurement quantity used in cell reselections. |
| $Q_{offset}$ | For intra-frequency: Equals to $Qoffset_{s,n}$, if $Qoffset_{s,n}$ is valid, otherwise this equals to zero. For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell as specified in TS 38.331. |

The UE shall perform ranking of all cells that fulfil the cell selection criterion S, which is defined in 3GPP TS 38.331, subclause 5.2.3.2.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall behave according to 3GPP TS 38.331, subclause 5.2.4.4.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave according to 3GPP TS 38.331, subclause 5.2.4.4.

In all cases, the UE shall reselect the new cell, only if the following conditions are met:

the new cell is better than the serving cell according to the cell reselection criteria specified above during a time interval $Treselection_{RAT}$;

more than 1 second has elapsed since the UE camped on the current serving cell.

5.2.5 Camped Normally state

This state is applicable for RRC_IDLE and RRC_INACTIVE state.

When camped normally, the UE shall perform the following tasks:

monitor the paging channel of the cell as specified in clause 7 according to information broadcast in SIB1;

monitor Short Messages transmitted with P-RNTI over DCI as specified in clause 6.5 in 3GPP TS 38.331 [3];

monitor relevant System Information as specified in 3GPP TS 38.331 [3];

perform necessary measurements for the cell reselection evaluation procedure;

execute the cell reselection evaluation process on the following occasions/triggers:

UE internal triggers, so as to meet performance as specified in 3GPP TS 38.133 [8];

When information on the BCCH used for the cell reselection evaluation procedure has been modified.

5.2.6 Selection of cell at transition to RRC_IDLE or RRC_INACTIVE state

At reception of RRCRelease message to transition the UE to RRC_IDLE or RRC_INACTIVE, UE shall attempt to camp on a suitable cell according to redirectedCarrierInfo if included in the RRCRelease message. If the UE cannot find a suitable cell, the UE is allowed to camp on any suitable cell of the indicated RAT. If the RRCRelease message does not contain the redirectedCarrierInfo, UE shall attempt to select a suitable cell on an NR carrier. If no suitable cell is found according to the above, the UE shall perform cell selection using stored information in order to find a suitable cell to camp on.

When returning to RRC_IDLE state after UE moved to RRC_CONNECTED state from camped on any cell state, UE shall attempt to camp on an acceptable cell according to redirectedCarrierInfo, if included in the RRCRelease message. If the UE cannot find an acceptable cell, the UE is allowed to camp on any acceptable cell of the indicated RAT. If the RRCRelease message does not contain redirectedCarrierInfo UE shall attempt to select an acceptable cell on an NR frequency. If no acceptable cell is found according to the above, the UE shall continue to search for an acceptable cell of any PLMN in state any cell selection.

5.2.7 Any Cell Selection state

This state is applicable for RRC_IDLE and RRC_INACTIVE state. In this state, the UE shall perform cell selection process to find a suitable cell. If the cell selection process fails to find a suitable cell after a complete scan of all RATs and all frequency bands supported by the UE, the UE shall attempt to find an acceptable cell of any PLMN to camp on, trying all RATs that are supported by the UE and searching first for a high-quality cell, as defined in 3GPP TS 38.331, subclause 5.1.1.2.

The UE, which is not camped on any cell, shall stay in this state.

5.2.8 Camped on Any Cell state

This state is only applicable for RRC_IDLE state. In this state, the UE shall perform the following tasks:

monitor Short Messages transmitted with P-RNTI over DCI as specified in clause 6.5 in 3GPP TS 38.331;

monitor relevant System Information as specified in 3GPP TS 38.331;

perform necessary measurements for the cell reselection evaluation procedure;

execute the cell reselection evaluation process on the following occasions/triggers:

UE internal triggers, so as to meet performance as specified in 3GPP TS 38.133;

When information on the BCCH used for the cell reselection evaluation procedure has been modified.

regularly attempt to find a suitable cell trying all frequencies of all RATs that are supported by the UE. If a suitable cell is found, UE shall move to camped normally state."

Cell Re-Selection Priorities

The cell re-selection priorities can be specified either in a dedicated manner (using RRCRelease when the UE is commanded to transition to a dormant state) or via broadcast using system information.

The ASN.1 structure for the NR RRCRelease message is shown below (only the relevant IEs are shown):

```
-- ASN1START
-- TAG-RRCRELEASE-START
```

-continued

```
RRCRelease ::=                    SEQUENCE {
  rrc-TransactionIdentifier          ,
  criticalExtensions               CHOICE {
    rrcRelease                     RRCRelease-IEs,
    criticalExtensionsFuture         SEQUENCE { }
  }
}
RRCRelease-IEs ::=                SEQUENCE {
  redirectedCarrierInfo              OPTIONAL,   -- Need N
  cellReselectionPriorities          OPTIONAL,   -- Need R
  suspendConfig                        OPTIONAL,   -- Need R
  deprioritisationReq             SEQUENCE {
    deprioritisationType             ENUMERATED {frequency, nr},
    deprioritisationTimer            ENUMERATED {min5, min10, min15, min30}
  }  OPTIONAL,   -- Need N
  lateNonCriticalExtension             OCTET STRING        OPTIONAL,
  nonCriticalExtension               RRCRelease-v1540-IEs    OPTIONAL
}
RRCRelease-v1540-IEs ::=            SEQUENCE {
  waitTime                        RejectWaitTime              OPTIONAL, -- Need N
  nonCriticalExtension              SEQUENCE { }               OPTIONAL
}
RedirectedCarrierInfo ::=           CHOICE {
  nr                              CarrierInfoNR,
  eutra                           RedirectedCarrierInfo-EUTRA,
  ...
}
RedirectedCarrierInfo-EUTRA ::=     SEQUENCE {
  eutraFrequency                    ARFCN-ValueEUTRA,
  cnType-r15                      ENUMERATED {epc,fiveGC}
OPTIONAL    -- Need N
}
CarrierInfoNR ::=                 SEQUENCE {
  carrierFreq                        ARFCN-ValueNR,
  ssbSubcarrierSpacing                 SubcarrierSpacing,
  smtc                             SSB-MTC   OPTIONAL,     -- Need S
  ...
}
CellReselectionPriorities ::=        SEQUENCE {
  freqPriorityListEUTRA                OPTIONAL,              -- Need M
  freqPriorityListNR                 OPTIONAL,              -- Need M
  t320                            ENUMERATED {min5, min10, min20, min30, min60,
min120, min180, spare1}    OPTIONAL,    -- Need R
  ...
}
FreqPriorityListEUTRA ::=                SEQUENCE (SIZE (1..maxFreq)) OF
FreqPriorityEUTRA
FreqPriority ListNR ::=              SEQUENCE (SIZE (1..maxFreq)) OF FreqPriorityNR
FreqPriorityEUTRA ::=                  SEQUENCE {
  carrierFreq                       ARFCN-ValueEUTRA,
  cellReselectionPriority              ,
  cellReselectionSubPriority           OPTIONAL               -- Need R
}
FreqPriorityNR ::=                SEQUENCE {
  carrierFreq                     ARFCN-ValueNR,
  cellReselectionPriority            ,
  cellReselectionSubPriority           OPTIONAL               -- Need R
}
CellReselectionPriority ::=          INTEGER (0..7)
CellReselectionSubPriority ::=          ENUMERATED {oDot2, oDot4, oDot6, oDot8}
```

As shown above, the UE can be provided with an optional cellReselectionPriorities IE that includes the list of NR or evolved universal terrestrial radio access (EUTRA) frequencies, along with their priorities.

The cell selection priorities and/or additional information, (e.g., a threshold), can also be provided in system information blocks (SIB), specifically, STB2, STB3, STB4 and SIB5. SIB2 contains cell re-selection information common for intra-frequency, inter-frequency and/or inter-RAT cell re-selection (i.e., applicable for more than one type of cell re-selection but not necessarily all) as well as intra-frequency cell re-selection information other than neighboring cell related information. For example, the thresholds controlling whether intra and inter-frequency cell re-selection measurements should be performed (s-IntraSearchP, s-IntraSearchQ, s-NonIntraSearchP, s-NonIntraSearchQ) are included in SIB2.

SIB3 contains neighboring cell related information relevant only for intra-frequency cell re-selection. The IE includes cells with specific re-selection parameters as well as blacklisted cells.

SIB4 contains information relevant only for inter-frequency cell re-selection, i.e., information about other NR frequencies and inter-frequency neighboring cells relevant for cell re-selection. The IE includes cell re-selection parameters common for a frequency as well as cell specific re-selection parameters.

SIB5 contains information relevant only for inter-RAT cell re-selection, i.e., information about E-UTRA frequencies and E-UTRAs neighboring cells relevant for cell re-selection. The IE includes cell re-selection parameters common for a frequency.

A UE in RRC_IDLE or RRC_INACTIVE state will camp on the highest ranking cell, based on the cell-ranking criterion, $R_s$, for the serving cell and Rn for the neighboring cells. This is defined by 3GPP TS 38.304 v15.2.0, as follows:

$R_s=Q_{meas,s}+Q_{hyst}-QOffset_{temp}$ $R_n=Q_{meas,n}-Qoffset-Qoffset_{temp}$ where:

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero. For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell as specified in TS 38.331 [3]. |

In some cases, the UE may reselect the new cell only if the following conditions are met:

the new cell is better than the serving cell according to the cell reselection criteria specified above during a time interval $Treselection_{RAT}$; and more than 1 second has elapsed since the UE camped on the current serving cell.

The variables are as follows:

$Qoffset_{s,n}$: This specifies the offset between the two cells;

$Qoffset_{frequency}$: Frequency specific offset for equal priority NR frequencies;

$Q_{hyst}$: *This specifies the hysteresis value for ranking criteria*;

$Qoffset_{temp}$: This specifies the additional offset to be used for cell selection and re-selection. It is temporarily used in case the RRC Connection Establishment fails on the cell as specified in 3GPP TS 38.331;

$Q_{qualmin}$: This specifies the minimum required quality level in the cell in dB;

$Q_{rxlevmin}$: This specifies the minimum required Rx level in the cell in dBm;

$Q_{rxlevminoffsetcell}$: This specifies the cell specific Rx level offset in dB to Qrxlevmin;

$Q_{qualminoffsetcell}$: This specifies the cell specific quality level offset in dB to Qqualmin;

Paging

When a UE needs to be reached for mobile-terminating data, a page is sent from the network. If the UE is in RRC_IDLE state, the page is initiated by the access and mobility management function (AMF) and if the UE is in RRC_INACTIVE state, the page is initiated from the next generation (NG)-RAN and, in particular, from the node in which data arrives from the core network. The so-called RAN paging can extend throughout the RAN Notification area, whereas a page from the AMF can extend throughout the CN Registration area.

When the network sends a paging message, it typically sends a paging message to several UEs at the same time. Each UE is associated with a PagingRecord. The definition of the paging message and paging record is found in 3GPP TS 38.331:

Paging

The Paging message is used for the notification of one or more UEs.

Signalling radio bearer: N/A

RLC-SAP: TM

Logical channel: PCCH

Direction: Network to UE

```
  -- ASN1START
  -- TAG-PAGING-START
  Paging ::=                    SEQUENCE {
    pagingRecordList                                                   OPTIONAL, --
Need N
    lateNonCriticalExtension              OCTET STRING
OPTIONAL,
    nonCriticalExtension                SEQUENCE{ }
OPTIONAL
  }
  PagingRecordList ::=               SEQUENCE (SIZE(1..maxNrofPageRec)) OF
PagingRecord
  PagingRecord ::=                 SEQUENCE {
    ue-Identity                 PagingUE-Identity,
    accessType                      ENUMERATED {non3GPP}        OPTIONAL,   -- Need
N
    ...
  }
  PagingUE-Identity ::=              CHOICE {
    ng-5G-S-TMSI                         NG-5G-S-TMSI,
    fullI-RNTI                  I-RNTI-Value,
    ...
  }
  -- TAG-PAGING-STOP
  -- ASN1STOP"
```

where accessType indicates whether the paging message is originated due to packet data unit (PDU) sessions from non-3GPP access.

A UE typically does not listen for pages all the time. There are specific paging occasions for which each UE can be paged and the rest of the time, the UE doesn't have to listen for pages at all. This is referred to as Discontinuous Reception or DRX.

The UE may use DRX in RRC_IDLE and RRC_INACTIVE state in order to reduce power consumption. The UE may monitor one paging occasion (PO) per DRX cycle. A PO is a set of the physical downlink control channel (PDCCH) monitoring occasions and can consist of multiple time slots (e.g., subframe or orthogonal frequency division multiplexed (OFDM) symbol) where paging downlink control information (DCI) can be sent (3GPP TS 38.213). One Paging Frame (PF) is one radio frame and may contain one or multiple POs or a starting point of a PO.

In multi-beam operations, the UE may assume that the same paging message and the same Short Message are repeated in all transmitted beams and thus the selection of the beam(s) for the reception of the paging message and Short Message may depend on UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:

(SFN+PF_offset) mod T=(T div N)*(UE_ID mod N)

Index (i_s), indicating the index of the PO is determined by:

i_s=floor (UE_ID/N) mod Ns

The PDCCH monitoring occasions for paging are determined according to pagingSearchSpace as specified in 3GPP TS 38.213 and firstPDCCH-MonitoringOccasionOfPO if configured as specified in 3GPP TS 38.331. When SearchSpaceId=0 is configured for pagingSearchSpace, the PDCCH monitoring occasions for paging are same as for RMSI as defined in clause 13 in 3GPP TS 38.213.

When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (is +1)th PO. A PO is a set of 'S' consecutive PDCCH monitoring occasions where 'S' is the number of actual transmitted synchronization signal blocks (SSBs) determined according to ssb-PositionsInBurst in SIB1. The Kth PDCCH monitoring occasion for paging in the PO corresponds to the Kth transmitted SSB. The PDCCH monitoring occasions for paging which do not overlap with UL symbols (determined according to tdd-UL-DL-ConfigurationCommon) are sequentially numbered from zero, starting from the first PDCCH monitoring occasion for paging in proportional fair (PF) scheduling. When firstPDCCH-MonitoringOccasionOfPO is present, the starting PDCCH monitoring occasion number of (is +1)th PO is the (is +1)th value of the firstPDCCH-MonitoringOccasionOfPO parameter; otherwise, it is equal to i_s*S.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value(s), if configured by RRC and/or upper layers, and a default DRX value broadcast in system information. In RRC_IDLE state, if the UE specific DRX is not configured by upper layers, the default value is applied).

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331. The parameterfirst-PDCCH-MonitoringOccasionOfPO is signalled in SIB1 for paging in initial DL BWP. For paging in a downlink (DL) bandwidth part (BWP) other than the initial DL BWP, the parameterfirst-PDCCH-MonitoringOccasionOfPO may be signaled in the corresponding BWP configuration.

If the UE has no 5G-S-TMSI (Fifth Generation temporary mobile subscriber identity), for example, when the UE has not yet registered onto the network, the UE may use as default identity, UE_ID=0 in the PF and i_s formulas above.

5G-S-TMSI is a 48 bit long bit string as defined in 3GPP TS 23.501. 5G-S-TMSI shall in the formulae above be interpreted as a binary number where the left most bit represents the most significant bit.

Slicing

A network operator may offer a number of different "network slices" to some or all subscribers. A network slice is composed of a collection of logical network functions that support communication according to a certain requirement or a certain business or service. For example, it is possible to define a specific slice for mobile broadband service, another for critical machine type communication (MTC) service and yet another slice that is offered as a service to a private company, such as a non-public entity that is allowed access to a specific slice. A slice can thus be associated to both a service offered by a network operator, or to a service provider that is having an agreement with the network operator.

These network slices can be viewed as a logical partitioning of the network, although network slicing is not necessarily partitioning the processing and capacity. In some instances, network slicing is also partitioning, e.g., processing and capacity, i.e., both a logical and a physical partitioning of the network. Another aspect of slicing can also be that an operator may choose to use certain frequencies for certain slices and other frequencies for other slices. In some scenarios, it may be that all frequencies support a certain slice, but an operator wants to gather communication of a certain type on one frequency due to, e.g., bandwidth availability. For example, it may be advantageous to gather low-latency communication on a wide bandwidth frequency such as a high-band frequency where bandwidth availability is large, rather than on low-frequency band where perhaps bandwidth availability is scarce.

A single UE might support different applications that might have different quality of service (QoS) requirements. From the network point of view, these QoS requirements might be handled in different slices with different frequencies. However, the UE can camp on only one frequency. If the paging-cause-value is mobile terminated data, then the UE may need to be paged in the frequency in which the UE is camping. If the UE supports both a mobile broad band (MBB) slice and an ultra-reliable low latency (URLLC) slice, the UE might be camping on a frequency for which the network supports the URLLC slice. For example, the network could control this via configuring higher priority for the frequency that supports the URLLC slice compared to the frequency that supports the MBB slice. In such scenario, if the network initiates the paging with a paging-cause-value as mobile terminated data and if the data is associated to the MBB slice, then the UE may be handed over to the MBB supported frequency soon after the UE transitions from idle/inactive mode to the connected mode. This will involve at least the following drawbacks;

1. Longer delay before the actual data delivery to the UE occurs, i.e., the UE needs to be handed over to the frequency where the MBB slice is supported;
2. More measurement overhead on both UE and the network as the cell on the frequency that supports the URLLC slice needs to first configure the measurements associated to the frequency in which the MBB slice is supported, with potentially larger percentage of the paging being associated to the MBB slice, rather than the URLLC slice. The overhead of sending most UEs to the correct frequency after they have transitioned to the connected state might be too large an overhead; and
3. With more UEs trying to access the RA (random access) channel in the frequency associated to the URLLC slice, there might be RA preamble collisions for the UEs that are receiving the paging message because of the URLLC related data.

SUMMARY

Some embodiments advantageously provide methods, network nodes and user equipment for inter-frequency redirection via paging.

Some embodiments include a method by which the paging message sent on one frequency can directly redirect the UE to go to another frequency and perform the RRCResume/RRCSetup on that frequency.

The UE, first network node (the node that performs the redirection of the UE via the paging message) and the second network node (the node that receives the UE and serves the UE for the respective slice data) exchange data so that:

1) The UE can quickly receive the slice specific data from the cells in the 'correct' frequency; and
2) The RA channel overhead is reduced in those frequencies where delay sensitive slice related UEs (URLLC UEs) try to access the cell.

According to an aspect of the present disclosure, a method implemented in a user equipment, UE, configured to communicate with a network node is provided. The method includes receiving a paging message from the network node on a first frequency, the paging message directing the UE to switch from the first frequency to a second frequency, the first frequency being associated with a first slice and the second frequency being associated with a second slice; and performing one of a radio resource control, RRC, resume and an RRC setup procedure on the second frequency.

In some embodiments of this aspect, at least one of: the UE is simultaneously registered to the first and second slices; the UE is camped on the first frequency; the first slice associated with the first frequency supports a first service and the second slice associated with the second frequency supports a second service; and/or one of the first and second services is ultra-reliable low latency communication, URLLC and another of the first and second services is enhanced mobile broadband, eMBB. In some embodiments of this aspect, the paging message indicates a service that paged the UE. In some embodiments of this aspect, the paging message indicates the second frequency. In some embodiments of this aspect, the paging messages comprises a paging record, the paging record comprising a frequency indication indicating the second frequency. In some embodiments, the second frequency is indicated by an absolute radio frequency channel number, ARFCN. In some embodiments, the second frequency is indicated by an index value. In some embodiments, the paging message indicates that the second frequency is on one of a low, a mid and a high frequency band.

In some embodiments of this aspect, the paging message comprises a frequency indication for all user equipments, UEs, being paged. In some embodiments of this aspect, a paging occasion, PO, on which the paging message is received is associated with the second frequency. In some embodiments of this aspect, the method further includes receiving a first information related to a paging channel, the first information indicating a frequency to which the UE is to be directed, the first information indicating a frequency to which the UE is to be directed; and monitoring the paging channel to determine whether the UE is being redirected to the frequency indicated in the first information. In some embodiments, receiving the first information includes receiving a configuration associated to the paging channel, the configuration indicating the frequency to which the UE is to be directed when the UE receives the paging message in a paging resource associated to the paging channel. In some embodiments, receiving the first information includes receiving a configuration in the paging channel, the configuration indicating the frequency to which the UE is to be directed. In some embodiments of this aspect, the method further includes receiving signaling associating the second frequency to the second slice, the paging message comprising an identifier associated with the second slice; and performing the one of the RRC resume and the RRC setup procedure on the second frequency is based at least in part on the identifier.

According to yet another aspect of the present disclosure, a method implemented in a network node configured to communicate with a user equipment, UE, is provided. The method comprises generating a paging message, the paging message directing the UE to switch from a first frequency to a second frequency on which to perform one of a radio resource control, RRC, resume and an RRC setup procedure, the first frequency being associated with a first slice and the second frequency being associated with a second slice; and sending the paging message to the UE on the first frequency.

In some embodiments of this aspect, at least one of: the UE is simultaneously registered to the first and second slices; the UE is camped on the first frequency; the first slice associated with the first frequency supports a first service and the second slice associated with the second frequency supports a second service; and/or one of the first and second services is ultra-reliable low latency communication, URLLC and another of the first and second services is enhanced mobile broadband, eMBB. In some embodiments of this aspect, the paging message indicates a service that paged the UE. In some embodiments of this aspect, the paging message indicates the second frequency. In some embodiments of this aspect, the paging messages comprises a paging record, the paging record comprising a frequency indication indicating the second frequency. In some embodiments, the second frequency is indicated by an absolute radio frequency channel number, ARFCN. In some embodiments, the second frequency is indicated by an index value. In some embodiments, the paging message indicates that the second frequency is on one of a low, a mid and a high frequency band. In some embodiments of this aspect, the paging message comprises a frequency indication for all user equipments, UEs, being paged.

In some embodiments of this aspect, a paging occasion, PO, on which the paging message is sent is associated with the second frequency. In some embodiments of this aspect, the method further includes sending a first information related to a paging channel, the first information indicating a frequency to which the UE is to be directed. In some embodiments, sending the first information includes sending a configuration associated to the paging channel, the configuration indicating the frequency to which the UE is to be directed when the UE receives the paging message in a paging resource associated to the paging channel. In some embodiments, sending the first information includes sending a configuration in the paging channel, the configuration indicating the frequency to which the UE is to be directed.

In some embodiments of this aspect, the method further includes sending signaling associating the second frequency to the second slice, the paging message comprising an identifier associated with the second slice and performance of the one of the RRC resume and the RRC setup procedure on the second frequency being based at least in part on the identifier. In some embodiments of this aspect, the method further includes receiving, from a mobility management network node, at least one of slice specific data associated with the UE and an indication to generate the paging message; and receipt, at the network node, of the at least one of the slice specific data and the indication to generate the paging message is based at least in part on a location of the UE relative to the network node and/or whether the network node supports the second slice.

In some embodiments of this aspect, the method further includes determining a second network node associated to the second frequency is in sleep mode and the second slice is being served by the second network node; and as a result of the determination, sending an indication to the second network node to start transmitting synchronization signals.

According to another aspect of the present disclosure, a user equipment, UE, configured to communicate with a network node is provided. The UE comprising processing circuitry. The processing circuitry is configured to cause the UE to receive a paging message from the network node on a first frequency, the paging message directing the UE to switch from the first frequency to a second frequency, the first frequency being associated with a first slice and the second frequency being associated with a second slice; and perform one of a radio resource control, RRC, resume and an RRC setup procedure on the second frequency.

In some embodiments of this aspect, at least one of: the UE is simultaneously registered to the first and second slices; the UE is camped on the first frequency; the first slice associated with the first frequency supports a first service and the second slice associated with the second frequency supports a second service; and/or one of the first and second services is ultra-reliable low latency communication, URLLC and another of the first and second services is enhanced mobile broadband, eMBB. In some embodiments of this aspect, the paging message indicates a service that paged the UE. In some embodiments of this aspect, the paging message indicates the second frequency. In some embodiments of this aspect, the paging messages comprises a paging record, the paging record comprising a frequency indication indicating the second frequency. In some embodiments, the second frequency is indicated by an absolute radio frequency channel number, ARFCN. In some embodiments, the second frequency is indicated by an index value. In some embodiments, the paging message indicates that the second frequency is on one of a low, a mid and a high frequency band.

In some embodiments of this aspect, the paging message comprises a frequency indication for all user equipments, UEs, being paged. In some embodiments of this aspect, a paging occasion, PO, on which the paging message is received is associated with the second frequency. In some embodiments of this aspect, the processing circuitry is further configured to cause the UE to: receive a first information related to a paging channel, the first information indicating a frequency to which the UE is to be redirected; and monitor the paging channel to determine whether the UE is being directed to the frequency indicated in the first information. In some embodiments, the processing circuitry is configured to cause the UE to receive the first information by being configured to cause the UE to receive a configuration associated to the paging channel, the configuration indicating the frequency to which the UE is to be directed when the UE receives the paging message in a paging resource associated to the paging channel. In some embodiments, the processing circuitry is configured to cause the UE to receive the first information by being configured to cause the UE to receive a configuration in the paging channel, the configuration indicating the frequency to which the UE is to be directed. In some embodiments of this aspect, the processing circuitry is further configured to cause the UE to receive signaling associating the second frequency to the second slice; the paging message comprises an identifier associated with the second slice; and performing the one of the RRC resume and the RRC setup procedure on the second frequency is based at least in part on the identifier.

According to another aspect of the present disclosure, a network node configured to communicate with a user equipment, UE, is provided. The network node comprises processing circuitry. The processing circuitry is configured to cause the network node to: generate a paging message, the paging message directing the UE to switch from a first frequency to a second frequency on which to perform one of a radio resource control, RRC, resume and an RRC setup procedure, the first frequency being associated with a first slice and the second frequency being associated with a second slice; and send the paging message to the UE on the first frequency.

In some embodiments of this aspect, at least one of: the UE is simultaneously registered to the first and second slices; the UE is camped on the first frequency; the first slice associated with the first frequency supports a first service and the second slice associated with the second frequency supports a second service; and/or one of the first and second services is ultra-reliable low latency communication, URLLC and another of the first and second services is enhanced mobile broadband, eMBB. In some embodiments of this aspect, the paging message indicates a service that paged the UE. In some embodiments of this aspect, the paging message indicates the second frequency. In some embodiments of this aspect, the paging messages comprises a paging record, the paging record comprising a frequency indication indicating the second frequency. In some embodiments, the second frequency is indicated by an absolute radio frequency channel number, ARFCN. In some embodiments, the second frequency is indicated by an index value. In some embodiments, the paging message indicates that the second frequency is on one of a low, a mid and a high frequency band. In some embodiments of this aspect, the paging message comprises a frequency indication for all user equipments, UEs, being paged.

In some embodiments of this aspect, a paging occasion, PO, on which the paging message is sent is associated with the second frequency. In some embodiments of this aspect, the processing circuitry is further configured to cause the network node to send a first information related to a paging channel, the first information indicating a frequency to which the UE is to be directed. In some embodiments, the processing circuitry is configured to cause the network node to send the first information by being configured to cause the network node to send a configuration associated to the paging channel, the configuration indicating the frequency to which the UE is to be directed when the UE receives the paging message in a paging resource associated to the paging channel. In some embodiments, the processing circuitry is configured to cause the network node to send the first information by being configured to cause the network node to send a configuration in the paging channel, the configuration indicating the frequency to which the UE is to be directed.

In some embodiments of this aspect, the processing circuitry is further configured to cause the network node to send signaling associating the second frequency to the second slice; and the paging message comprises an identifier associated with the second slice, performance of the one of the RRC resume and the RRC setup procedure on the second frequency being based at least in part on the identifier.

In some embodiments of this aspect, the processing circuitry is further configured to cause the network node to receive, from a mobility management network node, at least one of slice specific data associated with the UE and an indication to generate the paging message; and receipt, at the network node, of the at least one of the slice specific data and the indication to generate the paging message is based at least in part on a location of the UE relative to the network node and/or whether the network node supports the second slice. In some embodiments of this aspect, the processing circuitry is further configured to cause the network node to determine a second network node associated to the second frequency is in sleep mode and the second slice is being served by the second network node; and as a result of the determination, send an indication to the second network node to start transmitting synchronization signals.

According to another aspect of the present disclosure, a method implemented in a mobility management network node is provided. The method includes indicating to a first network node to generate a paging message, the paging message directing a user equipment, UE, to switch from a first frequency to a second frequency on which to perform one of a radio resource control, RRC, resume and an RRC setup procedure, the first frequency being associated with a first slice and the second frequency being associated with a second slice; and forwarding a slice specific data associated with the UE to a second network node, the second slice being served by the second network node and the first slice being served by the first network node.

According to yet another aspect of the present disclosure, a mobility management network node is provided. The mobility management network node includes processing circuitry. The processing circuitry is configured to cause the mobility management network node to indicate to a first network node to generate a paging message, the paging message directing a user equipment, UE, to switch from a first frequency to a second frequency on which to perform one of a radio resource control, RRC, resume and an RRC setup procedure, the first frequency being associated with a first slice and the second frequency being associated with a second slice; and forward a slice specific data associated with the UE to a second network node, the second slice being served by the second network node and the first slice being served by the first network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a flowchart of an exemplary process in a network node for inter-frequency redirection via paging.

FIG. 11 is a flowchart of an exemplary process in a network node for inter-frequency redirection via paging;

FIG. 12 is a flowchart of an exemplary process in a network node for inter-frequency redirection via paging;

DETAILED DESCRIPTION

Figure 1:
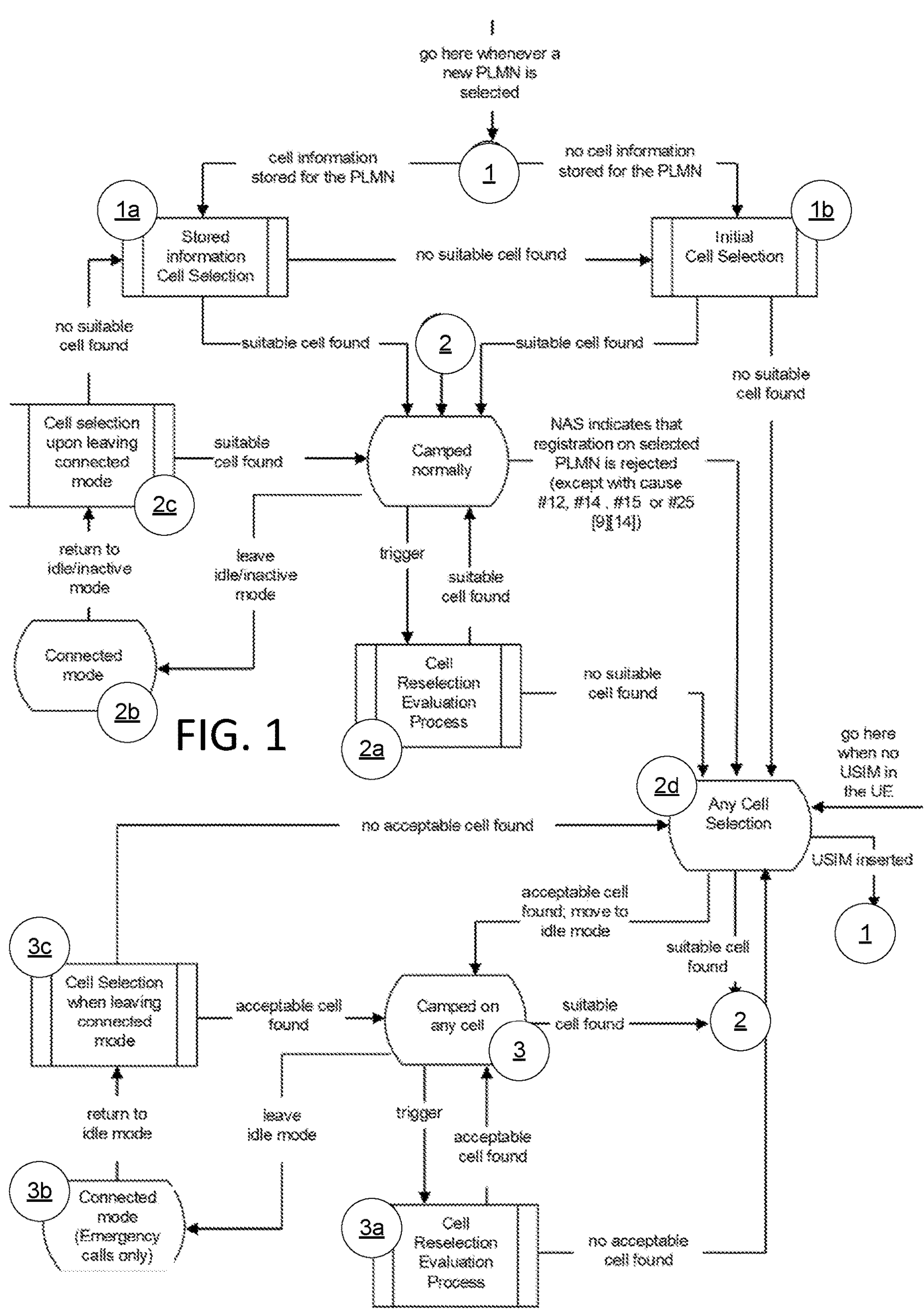
FIG. 1 shows a cell reselection process.

Before describing in detail exemplary embodiments, it is noted that the embodiments reside primarily in combinations of apparatus components and processing steps related to inter-frequency redirection via paging. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobility management network node such as access and management function (AMF) or mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a UE or a radio network node.

In some embodiments, the non-limiting terms wireless device (WD) and user equipment (UE) are used interchangeably. The UE herein can be any type of wireless device capable of communicating with a network node or another UE over radio signals, such as wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE or a network node may be distributed over a plurality of UEs and/or network nodes. In other words, it is contemplated that the functions of the network node and UE described herein are not limited to performance by a single physical device and, in fact, can be distributed among several physical devices.

In some embodiments, the terms "redirect", "direct" and "reselect" may be used herein interchangeably.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Various embodiments are now described in the context of a wireless system pursuant to 3GPP Fifth Generation Core (5GC)/NR specifications. The 3GPP specifications of particular relevance in connection to this invention are 3GPP TS 23.501, 24.501, 38.300, 38.304, 38.331, 38.413 and 38.423. However, embodiments are not necessarily limited to such systems. The following description should be considered as examples, not as a limitation on the particular RAT which may benefit from the application of principles set forth herein.

Figure 2:
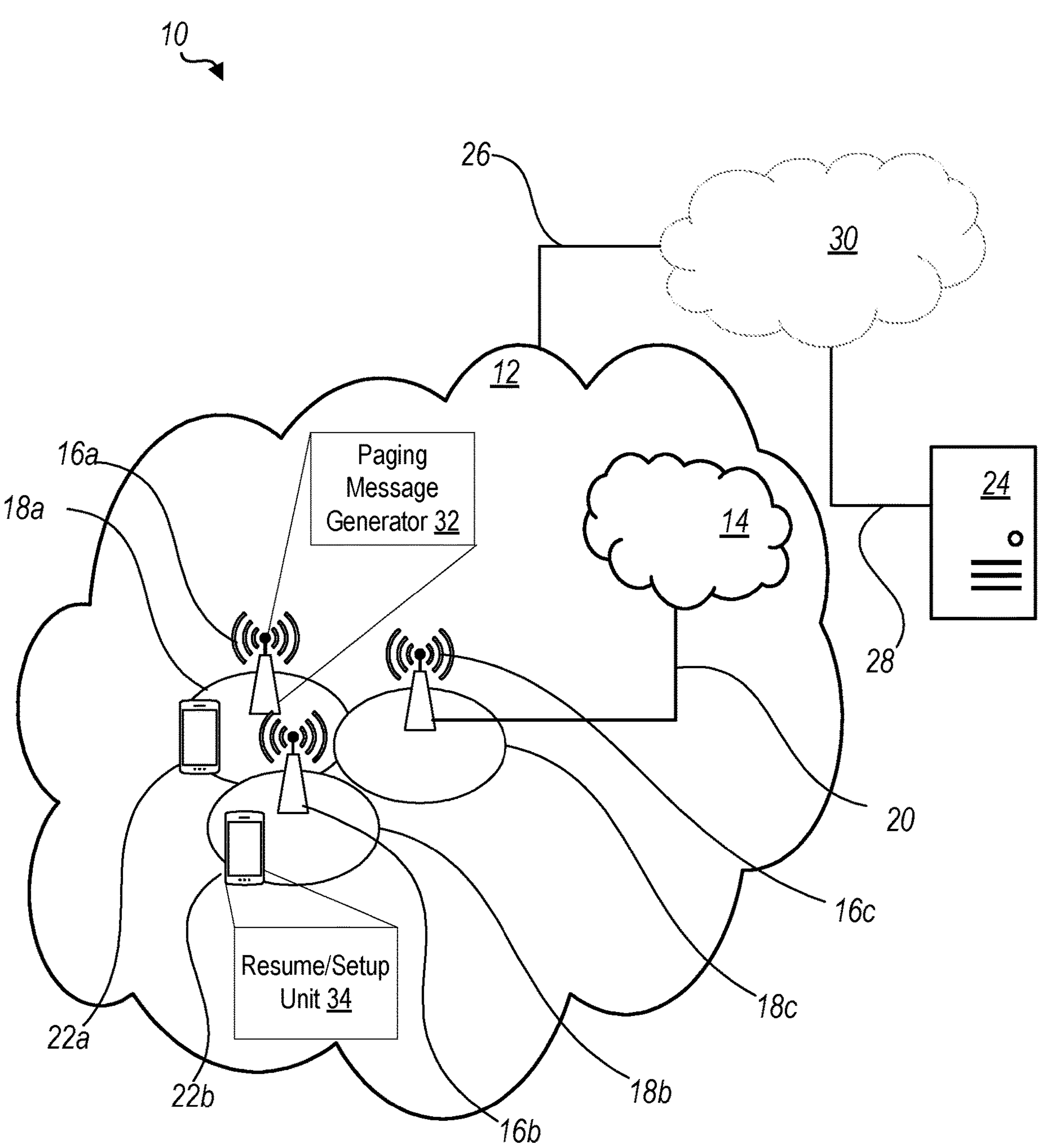
FIG. 2 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first UE 22*a* located in coverage area 18*a* is configured to wirelessly connect to, or be paged by, the corresponding network node 16*a*. A second UE 22*b* in coverage area 18*b* is wirelessly connectable to the corresponding network node 16*b*. While a plurality of UEs 22*a*, 22*b* (collectively referred to as UE 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected UEs 22*a*, 22*b* and the host computer 24. The connectivity may be described as an over-the-top (OTT) connection. The host computer 24 and the connected UEs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected UE 22*a*. Similarly, the network node 16 need not be aware of the future routing of an outgoing uplink communication originating from the UE 22*a* towards the host computer 24.

A network node 16 is configured to include a paging message generator 32 which is configured to generate a paging message directing the UE to switch to a first frequency on which to perform an RRCResume/RRCSetup procedure. A UE 22 is configured to include a Resume/Setup unit 34 which is configured to perform an RRCResume/RRCSetup procedure on a second frequency indicated by the paging message.

Example implementations, in accordance with an embodiment, of the UE 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the UE 22.

The communication system 10 further includes a network node 16 provided in a communication system 10 and including hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include paging message generator 32 which is configured to generate a paging message directing the UE to switch to a first frequency on which to perform an RRCResume/RRCSetup procedure.

The communication system 10 further includes the UE 22 already referred to. The UE 22 may have hardware 80 that may include a radio interface 82 configured to set up and maintain a wireless connection 64 with a network node 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22. For example, the processing circuitry 84 of the UE 22 may include Resume/Setup unit 34 which is configured to perform an RRCResume/RRCSetup procedure on a second frequency indicated by the paging message.

Figure 3:
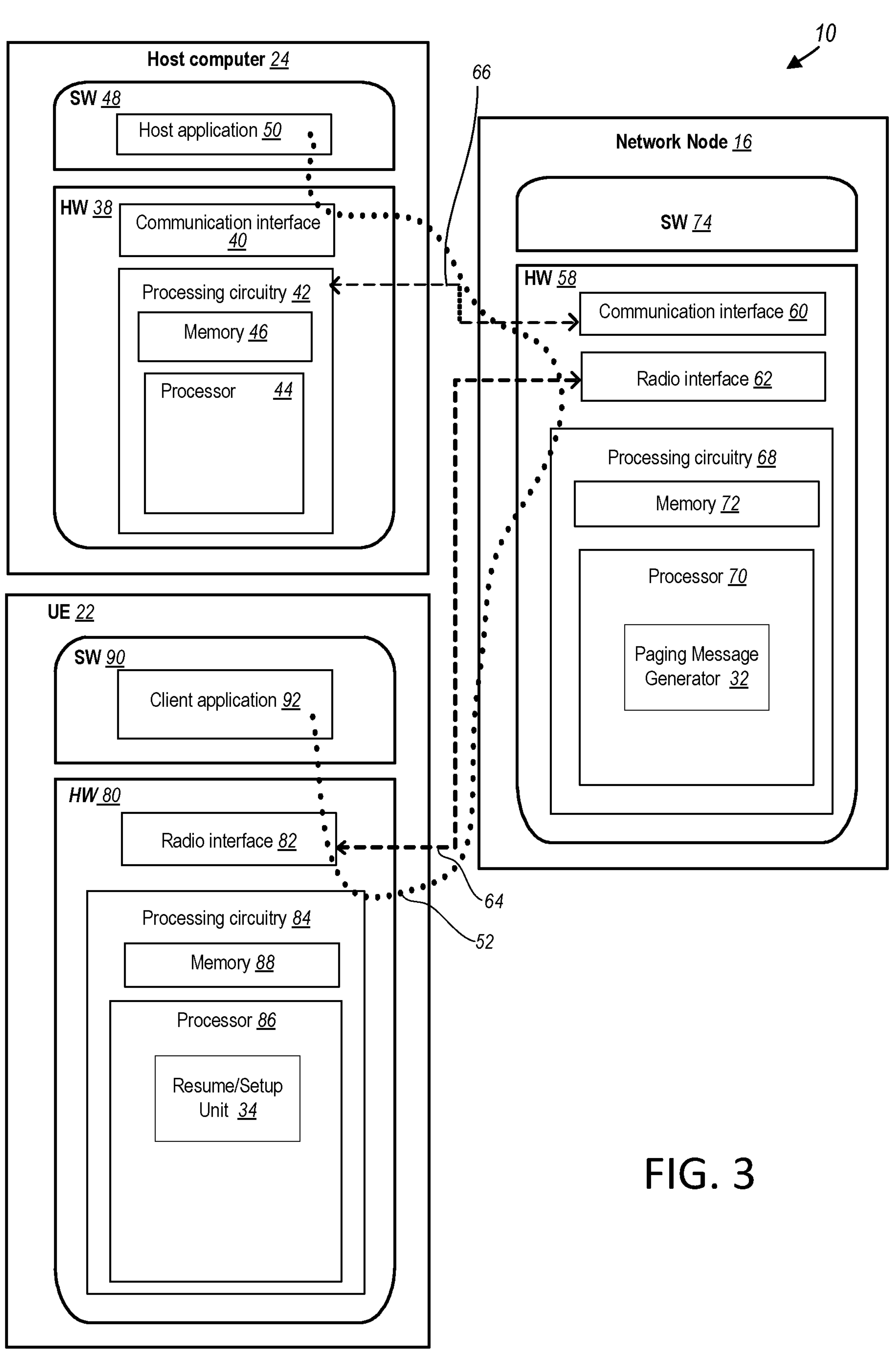
FIG. 3 is a block diagram of a host computer communicating via a network node with a UE over an at least partially wireless connection according to some embodiments of the present disclosure.

In some embodiments, the inner workings of the network node 16, UE 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the UE 22 via the network node 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 22 and the network node 16 is in accordance with the teachings of the embodiments described throughout this disclosure. One or more of the various embodiments improve the performance of OTT services provided to the UE 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a network node 16. In some embodiments, the UE 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as paging message generator 32, and Resume/Setup unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
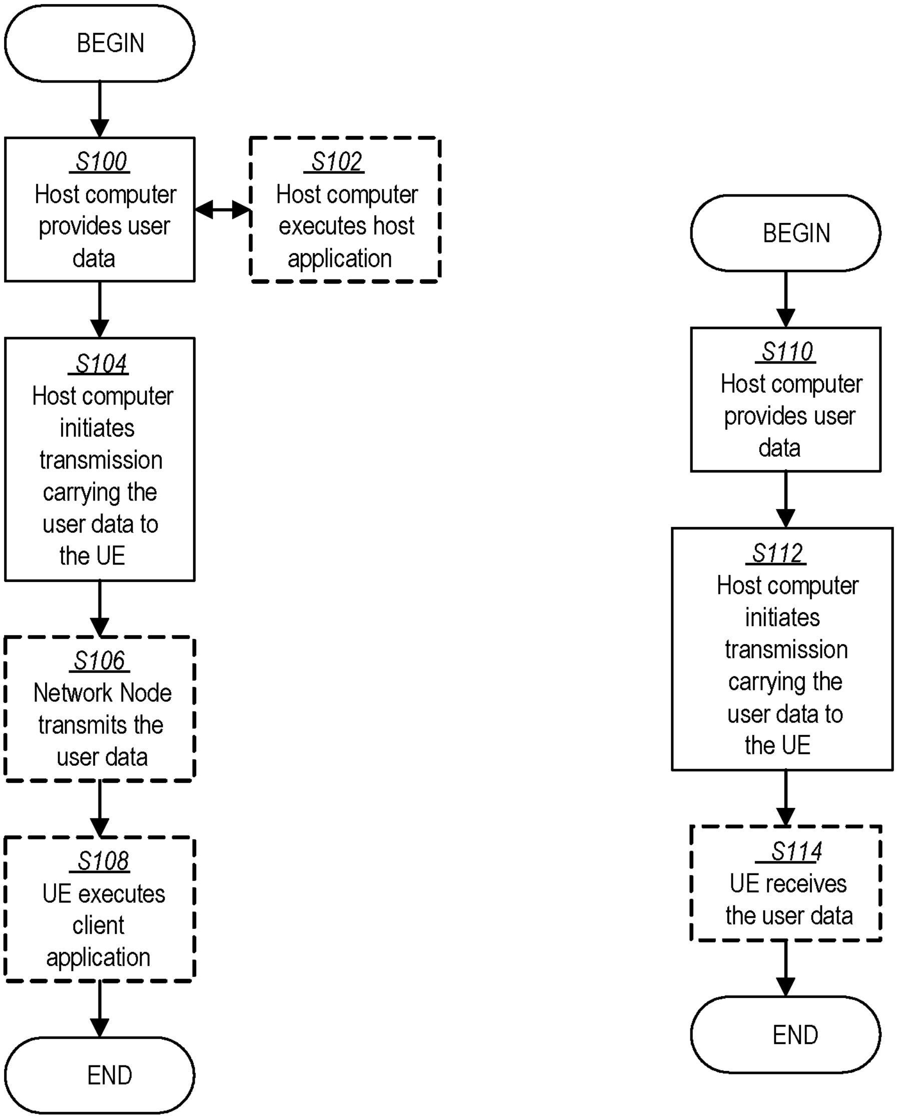
FIG. 4 is a flowchart illustrating exemplary methods implemented in a communication system including a host computer, a network node and a UE for executing a client application at a UE according to some embodiments of the present disclosure.
FIG. 5 is a flowchart illustrating exemplary methods implemented in a communication system including a host computer, a network node and a UE for receiving user data at a UE according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a UE 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the UE 22 (Block S104). In an optional third step, the network node 16 transmits to the UE 22 the user data which was carried in the transmission that the host computer 24 initiated, in accordance with the teachings of the embodiments described throughout this disclosure (Block S106). In an optional fourth step, the UE 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a UE 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the UE 22 (Block S112). The transmission may pass via the network node 16, in accordance with the teachings of the embodiments described throughout this disclosure. In an optional third step, the UE 22 receives the user data carried in the transmission (Block S114).

Figures 6, 7:
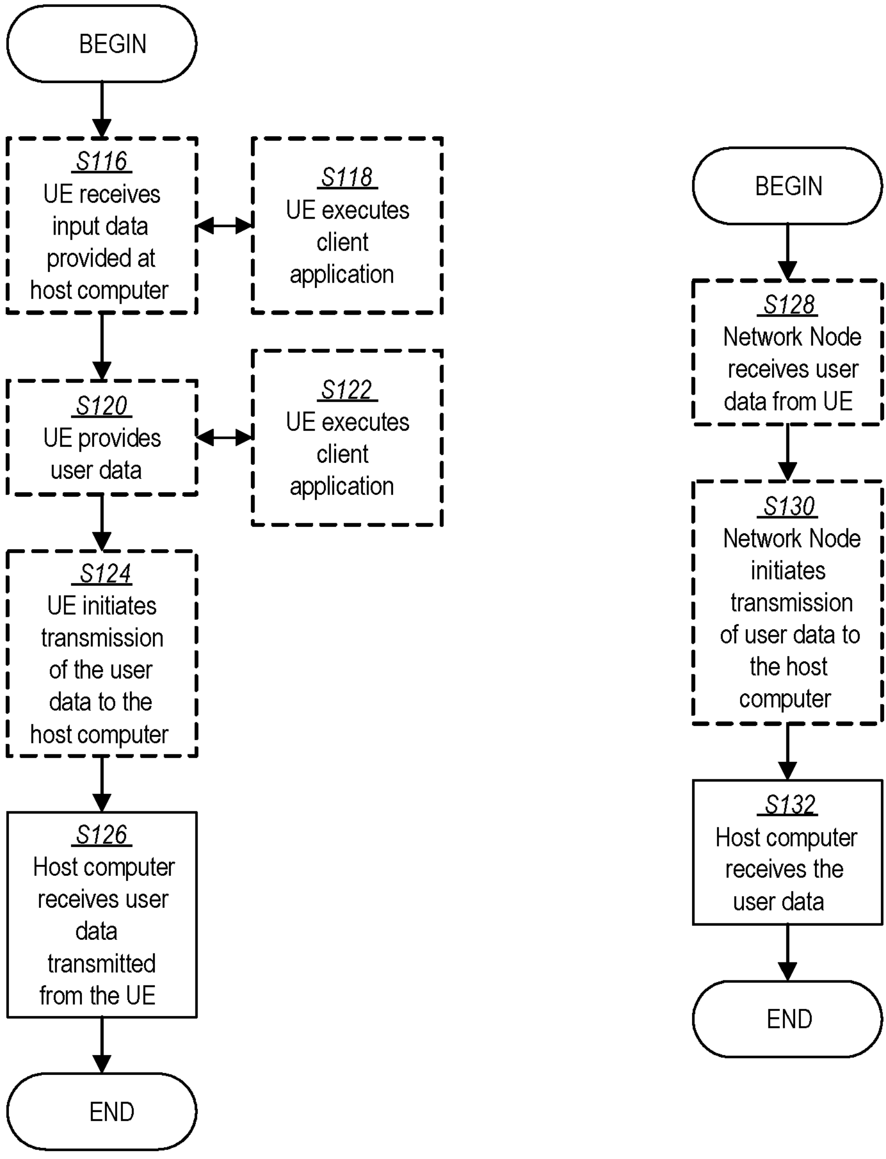
FIG. 6 is a flowchart illustrating exemplary methods implemented in a communication system including a host computer, a network node and a UE for receiving user data from the UE at a host computer according to some embodiments of the present disclosure.
FIG. 7 is a flowchart illustrating exemplary methods implemented in a communication system including a host computer, a network node and a UE for receiving user data at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a UE 22, which may be those described with reference to FIGS. 2 and 3. In an optional first step of the method, the UE 22 receives input data provided by the host computer 24 (Block S116). In an optional substep of the first step, the UE 22 executes the client application 92, which provides the user data in reaction to the received input data provided by the host computer 24 (Block S118). Additionally or alternatively, in an optional second step, the UE 22 provides user data (Block S120). In an optional substep of the second step, the UE provides the user data by executing a client application, such as, for example, client application 92 (Block S122). In providing the user data, the executed client application 92 may further consider user input received from the user. Regardless of the specific manner in which the user data was provided, the UE 22 may initiate, in an optional third substep, transmission of the user data to the host computer 24 (Block S124). In a fourth step of the method, the host computer 24 receives the user data transmitted from the UE 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a UE 22, which may be those described with reference to FIGS. 2 and 3. In an optional first step of the method, in accordance with the teachings of the embodiments described throughout this disclosure, the network node 16 receives user data from the UE 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
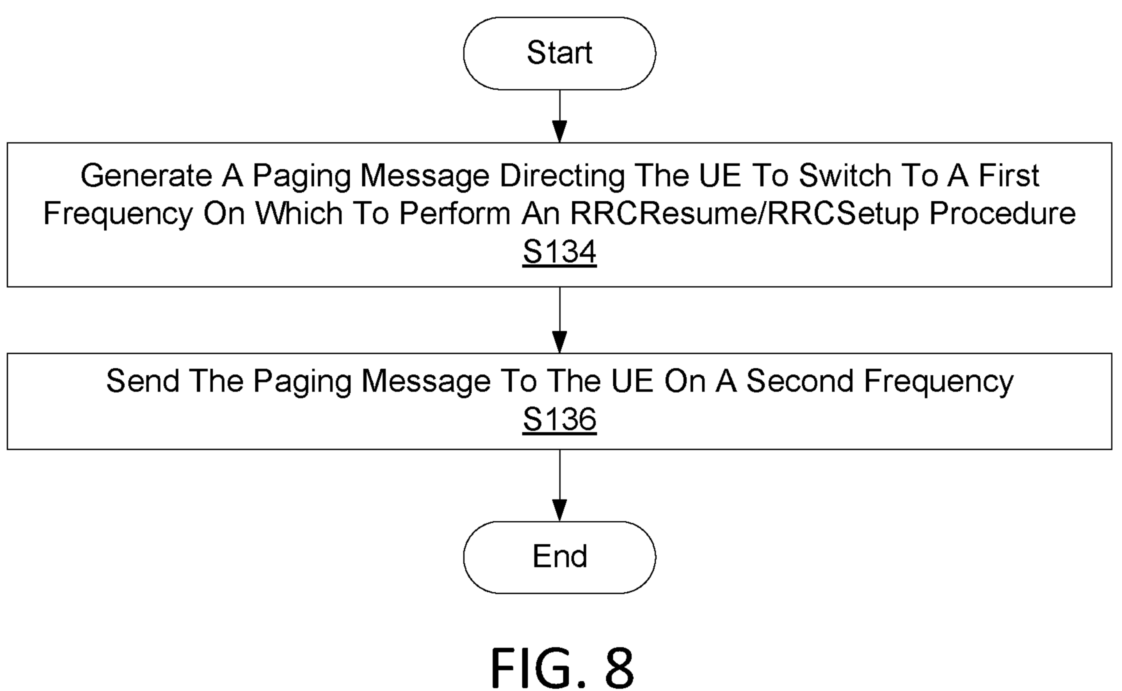
FIG. 8 is a flowchart of an exemplary process in a network node for inter-frequency redirection via paging.

FIG. 8 is a flowchart of an exemplary process in a network node 16 for inter-frequency redirection via paging. One or more blocks described herein may be performed by one or more elements of network node 16 such as by one or more of processing circuitry 68 (including the paging message generator 32), processor 70, radio interface 62 and/or communication interface 60. Network node 16 such as via processing circuitry 68 and/or processor 70 and/or radio interface 62 and/or communication interface 60 is configured to generate a paging message directing the UE to switch to a first frequency on which to perform an RRCResume/RRCSetup procedure (Block S134). The process also includes sending the paging message to the UE on a second frequency (Block S136).

Figure 9:
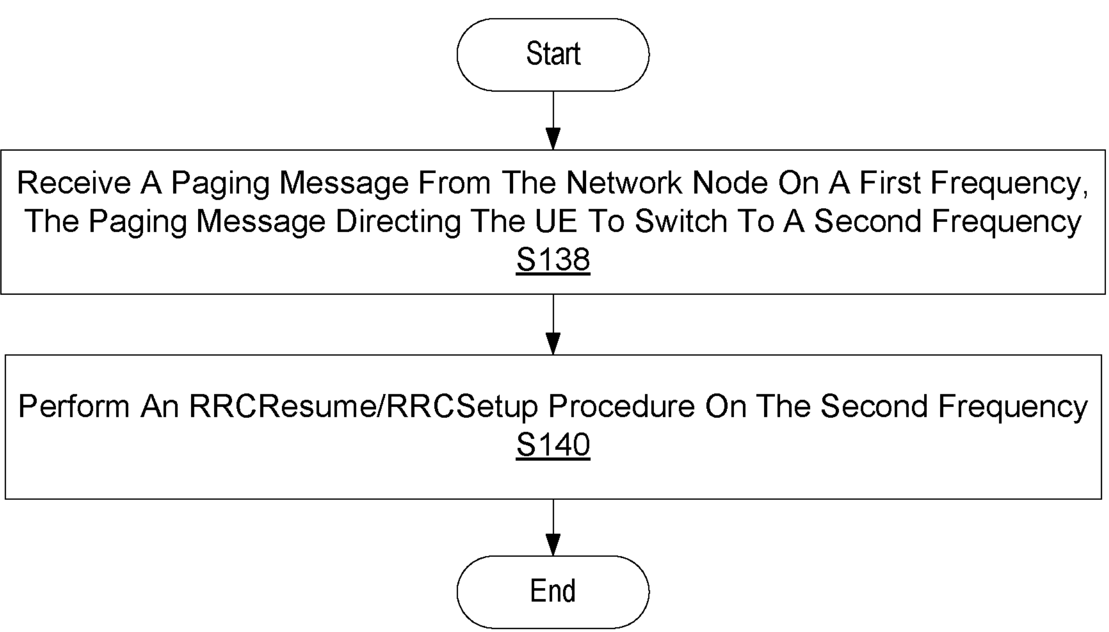
FIG. 9 is a flowchart of an exemplary process in a UE for inter-frequency redirection via paging.

FIG. 9 is a flowchart of an exemplary process in a UE 22 according to some embodiments of the present disclosure. One or more blocks described herein may be performed by one or more elements of UE 22 such as by one or more of processing circuitry 84 (including the Resume/Setup unit 34), processor 86, radio interface 82 and/or communication interface 60. UE 22 such as via processing circuitry 84 and/or processor 86 and/or radio interface 82 is configured to receive a paging message from the network node on a first frequency, the paging message directing the UE to switch to a second frequency (Block S138). The process also includes performing an RRCResume/RRCSetup procedure on the second frequency (Block S140).

FIG. 10 is a flowchart of an exemplary process in a network node 16 for inter-frequency redirection via paging. One or more blocks described herein may be performed by one or more elements of network node 16 such as by one or more of processing circuitry 68 (including the paging message generator 32), processor 70, radio interface 62 and/or communication interface 60. The process includes generating (Block S142), such as by one or more of processing circuitry 68 (including the paging message generator 32), processor 70, radio interface 62 and/or communication interface 60, a paging message, the paging message directing the UE to switch from a first frequency to a second frequency on which to perform one of a radio resource control, RRC, resume and an RRC setup procedure, the first frequency being associated with a first slice and the second frequency being associated with a second slice. The process includes sending (Block S144), such as by one or more of processing circuitry 68 (including the paging message generator 32), processor 70, radio interface 62 and/or communication interface 60, the paging message to the UE on the first frequency.

In some embodiments, at least one of: the UE is simultaneously registered to the first and second slices; the UE is camped on the first frequency; the first slice associated with the first frequency supports a first service and the second slice associated with the second frequency supports a second service; and/or one of the first and second services is ultra-reliable low latency communication, URLLC and another of the first and second services is enhanced mobile broadband, eMBB. In some embodiments, the paging message indicates a service that paged the UE. In some embodiments, the paging message indicates the second frequency. In some embodiments, the paging messages comprises a paging record, the paging record comprising a frequency indication indicating the second frequency. In some embodiments, the second frequency is indicated by an absolute radio frequency channel number, ARFCN. In some embodiments, the second frequency is indicated by an index value. In some embodiments, the paging message indicates that the second frequency is on one of a low, a mid and a high frequency band. In some embodiments, the paging message comprises a frequency indication for all user equipments, UEs, being paged. In some embodiments, a paging occasion, PO, on which the paging message is sent is associated with the second frequency.

In some embodiments, the process further includes sending, such as by one or more of processing circuitry 68 (including the paging message generator 32), processor 70, radio interface 62 and/or communication interface 60, a first information related to a paging channel, the first information indicating a frequency to which the UE is to be directed. In some embodiments, sending the first information includes sending, such as by one or more of processing circuitry 68 (including the paging message generator 32), processor 70, radio interface 62 and/or communication interface 60, a configuration associated to the paging channel, the configuration indicating the frequency to which the UE is to be directed when the UE receives the paging message in a paging resource associated to the paging channel. In some embodiments, sending the first information includes sending, such as by one or more of processing circuitry 68 (including the paging message generator 32), processor 70, radio interface 62 and/or communication interface 60, a configuration in the paging channel, the configuration indicating the frequency to which the UE is to be directed.

In some embodiments, the method further includes sending, such as by one or more of processing circuitry 68 (including the paging message generator 32), processor 70, radio interface 62 and/or communication interface 60, signaling associating the second frequency to the second slice; and the paging message comprises an identifier associated with the second slice, performance of the one of the RRC resume and the RRC setup procedure on the second frequency being based at least in part on the identifier.

In some embodiments, the method further includes receiving, from a mobility management network node, at least one of slice specific data associated with the UE and an indication to generate the paging message; and wherein receipt, at the network node, of the at least one of the slice specific data and the indication to generate the paging message is based at least in part on a location of the UE relative to the network node and/or whether the network node supports the second slice. In some embodiments, the method further includes determining, such as by one or more of processing circuitry 68 (including the paging message generator 32), processor 70, radio interface 62 and/or communication interface 60, a second network node associated to the second frequency is in sleep mode and the second slice is being served by the second network node; and as a result of the determination, sending, such as by one or more of processing circuitry 68 (including the paging message generator 32), processor 70, radio interface 62 and/or communication interface 60, an indication to the second network node to start transmitting synchronization signals.

FIG. 11 is a flowchart of an exemplary process in a UE 22 according to some embodiments of the present disclosure. One or more blocks described herein may be performed by one or more elements of UE 22 such as by one or more of processing circuitry 84 (including the Resume/Setup unit 34), processor 86, radio interface 82 and/or communication interface 60. The process includes receiving (Block S146), such as by one or more of processing circuitry 84 (including the Resume/Setup unit 34), processor 86 and/or radio interface 82, a paging message from the network node on a first frequency, the paging message directing the UE to switch from the first frequency to a second frequency, the first frequency being associated with a first slice and the second frequency being associated with a second slice. The process includes performing (Block S148), such as by one or more of processing circuitry 84 (including the Resume/Setup unit 34), processor 86 and/or radio interface 82, one of a radio resource control, RRC, resume and an RRC setup procedure on the second frequency.

In some embodiments, at least one of: the UE 22 is simultaneously registered to the first and second slices; the UE 22 is camped on the first frequency; the first slice associated with the first frequency supports a first service and the second slice associated with the second frequency supports a second service; and/or one of the first and second services is ultra-reliable low latency communication, URLLC and another of the first and second services is enhanced mobile broadband, eMBB. In some embodiments, the paging message indicates a service that paged the UE 22. In some embodiments, the paging message indicates the second frequency. In some embodiments, the paging messages comprises a paging record, the paging record comprising a frequency indication indicating the second frequency. In some embodiments, the second frequency is indicated by an absolute radio frequency channel number, ARFCN. In some embodiments, the second frequency is indicated by an index value. In some embodiments, the paging message indicates that the second frequency is on one of a low, a mid and a high frequency band. In some embodiments, the paging message comprises a frequency indication for all user equipments, UEs, being paged. In some embodiments, a paging occasion, PO, on which the paging message is received is associated with the second frequency.

In some embodiments, the method further includes receiving, such as by one or more of processing circuitry 84 (including the Resume/Setup unit 34), processor 86 and/or radio interface 82, a first information related to a paging channel, the first information indicating a frequency to which the UE is to be directed; and monitoring, such as by one or more of processing circuitry 84 (including the Resume/Setup unit 34), processor 86 and/or radio interface 82, the paging channel to determine whether the UE 22 is being redirected to the frequency indicated in the first information. In some embodiments, receiving the first information includes receiving, such as by one or more of processing circuitry 84 (including the Resume/Setup unit 34), processor 86 and/or radio interface 82, a configuration associated to the paging channel, the configuration indicating the frequency to which the UE is to be directed when the UE receives the paging message in a paging resource associated to the paging channel. In some embodiments, receiving the first information includes receiving, such as by one or more of processing circuitry 84 (including the Resume/Setup unit 34), processor 86 and/or radio interface 82, a configuration in the paging channel, the configuration indicating the frequency to which the UE is to be directed.

In some embodiments, the method further includes receiving, such as by one or more of processing circuitry 84 (including the Resume/Setup unit 34), processor 86 and/or radio interface 82, signaling associating the second frequency to the second slice, the paging message comprising an identifier associated with the second slice; and performing, such as by one or more of processing circuitry 84 (including the Resume/Setup unit 34), processor 86 and/or radio interface 82, the one of the RRC resume and the RRC setup procedure on the second frequency is based at least in part on the identifier.

FIG. 12 is a flowchart of an exemplary process in a network node 16 (e.g., mobility management network node, AMF, MME) for inter-frequency redirection via paging. One or more blocks described herein may be performed by one or more elements of network node 16 such as by one or more of processing circuitry 68, processor 70, radio interface 62 and/or communication interface 60. The process includes indicating (Block S150), such as by one or more of processing circuitry 68, processor 70, radio interface 62 and/or communication interface 60, to a first network node to generate a paging message, the paging message directing a user equipment, UE, 22 to switch from a first frequency to a second frequency on which to perform one of a radio resource control, RRC, resume and an RRC setup procedure, the first frequency being associated with a first slice and the second frequency being associated with a second slice. The process includes forwarding (Block S152), such as by one or more of processing circuitry 68, processor 70, radio interface 62 and/or communication interface 60, a slice specific data associated with the UE 22 to a second network node, the second slice being served by the second network node and the first slice being served by the first network node.

Having described the general process flow of arrangements of the disclosure and having provided examples of hardware and software arrangements for implementing the processes and functions of the disclosure, the sections below provide details and examples of arrangements for inter-frequency redirection via paging.

Figure 13:
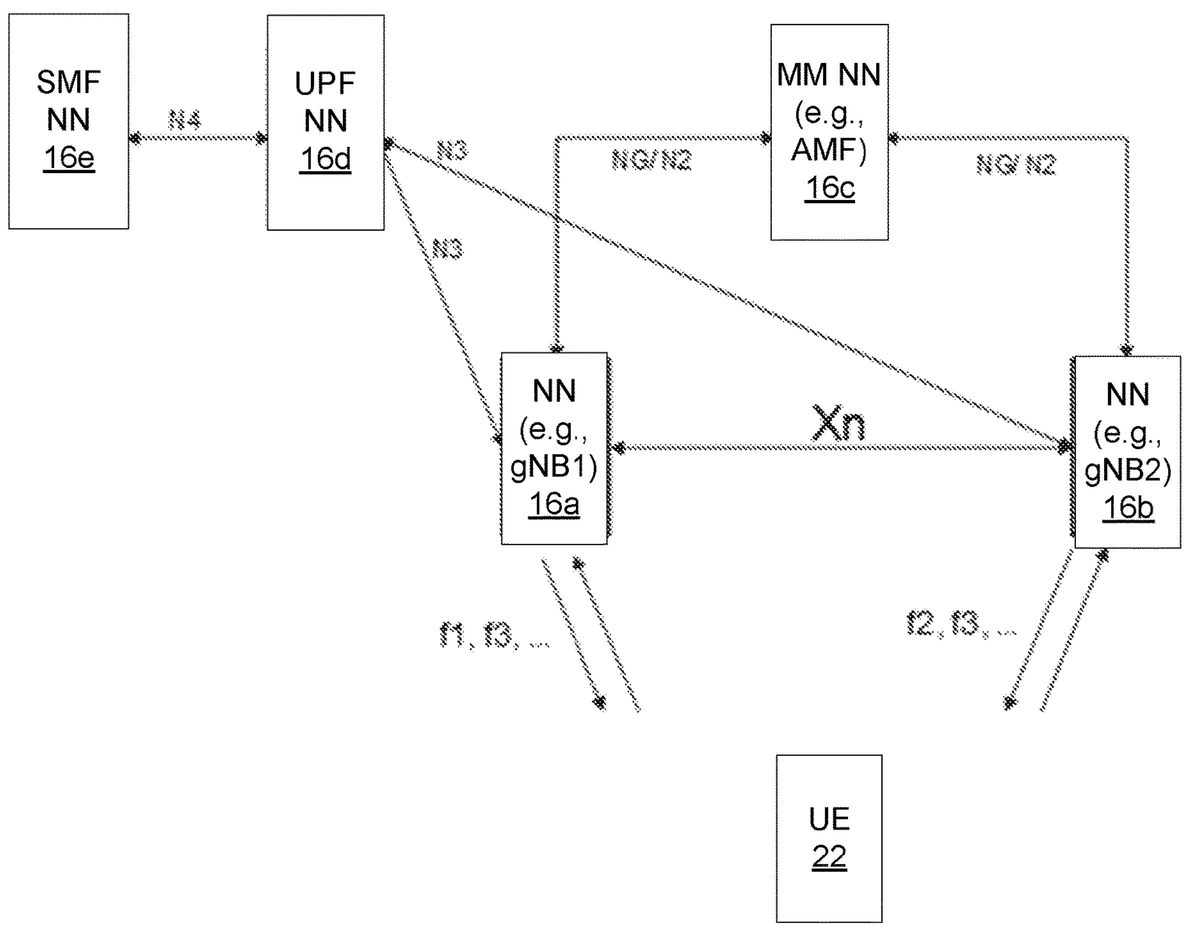
FIG. 13 illustrates a UE and two different NR base stations (gNBs)

The system overview in FIG. 13 illustrates a UE 22 and two different NR network nodes, i.e., base stations (gNBs). Thus, for ease of understanding, gNB1 and gNB2, hereinafter are also referred to as network nodes 16*a* and 16*b*. gNB1 and gNB2 (network nodes 16*a* and 16*b*) both utilize frequency f3, but only network node 16*a* utilizing frequency f1 and network node 16*b* utilizing frequency f2. The network nodes 16 are interconnected via an Xn interface. Further each of network nodes 16*a* and 16*b* is connected to a mobility management network node (MM NN) 16*c* (e.g., an access and mobility management function (AMF)) via an NG interface. The interface between a gNB and an AMF is also sometimes referred to as an N2 interface. The gNBs connect to a user plane function (UPF) network node (NN) 16*d* via an N3 interface, which in turn is connected to a session management function (SMF) network node (NN) 16*e*. The detailed operation of the SMF NN 16*e*, UPF NN 16*d*, and AMF/MM NN 16*c* other than what is described herein as relating to those devices is beyond the scope of this disclosure. It is noted that, in some embodiments, the AMF described herein may include one or more of the same components as network node 16.

In other words, the AMF can be a network node and may include processing circuitry, communication and radio interfaces and software as with the network node 16 described above.

In some embodiments, the network node 16 initiates or triggers a connection to become activated, causing the UE to transition to a "CONNECTED" state. Typically, this may happen when there is data that arrives at the network node 16 that is intended for the UE 22.

If the UE 22 is in what is referred to as RRC_IDLE mode, data may arrive in the UPF and this will trigger that AMF to cause a paging message to be sent to the UE 22. In this state, there is no active connection between the UE 22 and the core network, and the network node 16 may try to page the UE 22 throughout a core network registration area.

If a UE 22 responds to a page from RRC_IDLE, it may do so in the same way as if a connection was triggered by that data in the UE that would need to be transmitted. There is one difference: there is an establishment cause sent to the message that reveals if an access attempt is due to mobile terminating (MT) data or mobile originating (MO) data.

Figure 14:
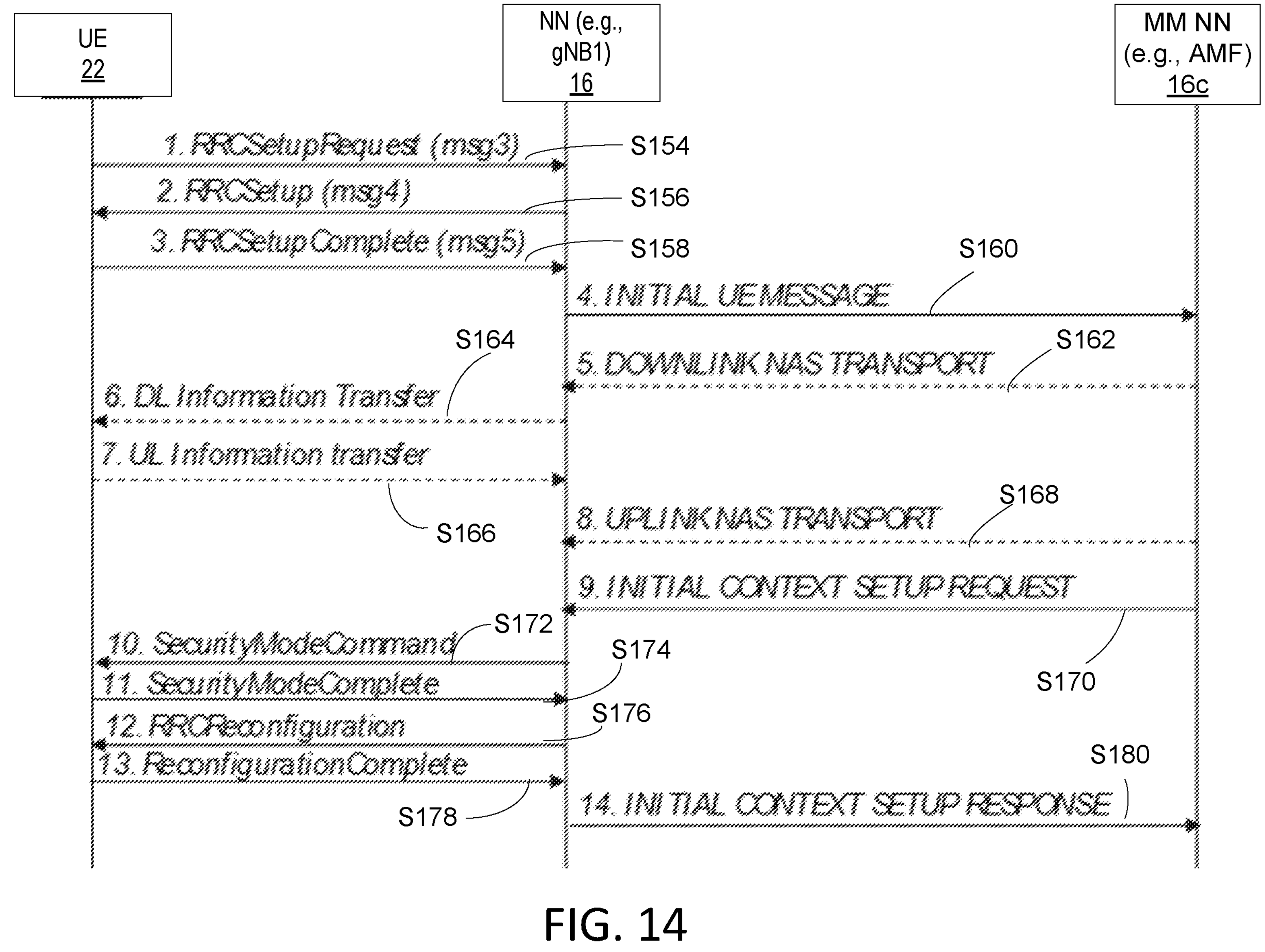
FIG. 14 illustrates a signaling sequence that may be followed before a UE can start receiving downlink data in some embodiments.

The signaling sequence illustrated in FIG. 14 may be followed before a UE 22 can start receiving downlink data, if the UE starts from the IDLE state, in some embodiments. As a response to a page, the signaling sequence of FIG. 14 may occur, and after the initial context setup response to the AMF (i.e., MM NN 16*c*), the connection towards the core network is established and user plane is added.

The signaling sequence in FIG. 14 includes:

at step S154, the UE 22 sending an RRC setup request;

at step S156, NN 16 responding with an RRC set up message;

at step S158, the UE 22 sending an RRC setup complete message;

at step S160, the NN 16 sending an initial UE message to MM NN 16*c;* at step S162, the NN 16 receiving a downlink non-access stratum (NAS) transport link message from MM NN 16*c;* at steps S164 and S166, the NN 16 sending downlink (DL) information transfer message to UE 22 and the UE sending uplink (UL) information transfer message to the NN 16, respectively;

at steps S168 and S170, NN 16 sends the uplink NAS transport message and MM NN 16*c* sends the initial context setup request, respectively;

at steps S172-S178, security mode information and RRC reconfiguration information is exchanged between the UE 22 and NN 16; and at steps S180, an initial context setup response message is sent to MM NN 16*c*.

If a UE 22 starts from RRC_INACTIVE, for example as described in 3GPP TS 38.300, the signaling sequence may be slightly different, as the UE is already known in the network and there is context information about the UE 22 and connection to the UE 22. The context information may be stored in the network node 16 or the UE 22.

In the signaling sequence of FIG. 14, the UE 22 was previously visiting or communicating with gNB2 and it has now moved to connect to the network via gNB1. Thus, gNB1 may retrieve the context from gNB2 to be able to resume the connection correctly.

Once the connection between gNB1 and the UE 22 is established and/or subsequent to RRCResumeComplete, communication can be resumed between the network and the UE.

Typically the UE 22 may continue control signaling to switch the path from between the network and the AMF node to the new gNB (gNB1 in this case). Then both the context and the path to the UE 22 would instead go via gNB1 as this was the last location of the UE 22.

A UE 22 may typically respond to a page in the cell or on a carrier frequency that the UE 22 is currently listening to and camping on. There can be two situations when this is not optimal, and where it may be necessary to re-direct the UE 22 to another frequency.

Basically, directly after having established a connection the UE may need to be redirected, since the network operator might prefer to serve a certain slice in a certain frequency, other than the one the UE 22 responded to the page on.

The first situation for which the UE 22 may be redirected to another frequency is when the UE 22 may be simultaneously registered on two slices and have chosen for its idle/inactive mode mobility to follow the optimal camping for the slice that didn't trigger the page. In other words, the UE 22 is camping on cells that are optimal for slice 1, but it is slice 2 that is triggering a page. In such situations, it may be that the network operator prefers or needs to switch or re-direct the UE 22 to another frequency before it can serve the UE 22 with the user data connection.

The second situation for which the UE 22 may be redirected to another frequency is when the UE 22 has selected to camp on a frequency that was serving the slice that triggered the page in another part of the network, when, in the part of the network that the UE is currently, the situation is different. Namely, when the network operator has another preference as to what frequency a UE 22 should connect, the UE 22 may be redirected to the preferred frequency.

Now, regardless of what triggered the first or second situation (or other situation for which the UE 22 may be redirected to another frequency), when a page for an MT-connection is received and the UE 22 responds on frequency f2, for example, towards gNB2, as illustrated in FIG. 14, and the service or slice that actually triggered the page is not available on f2/gNB2 (or alternatively, when the network operator wants to serve the UE 22 on f1), then the UE 22 would need to be re-directed to another cell (gNB1) once it has established a connection with the network. Such a re-direction takes resources and time and it would be advantageous if it can be avoided.

Figure 15:
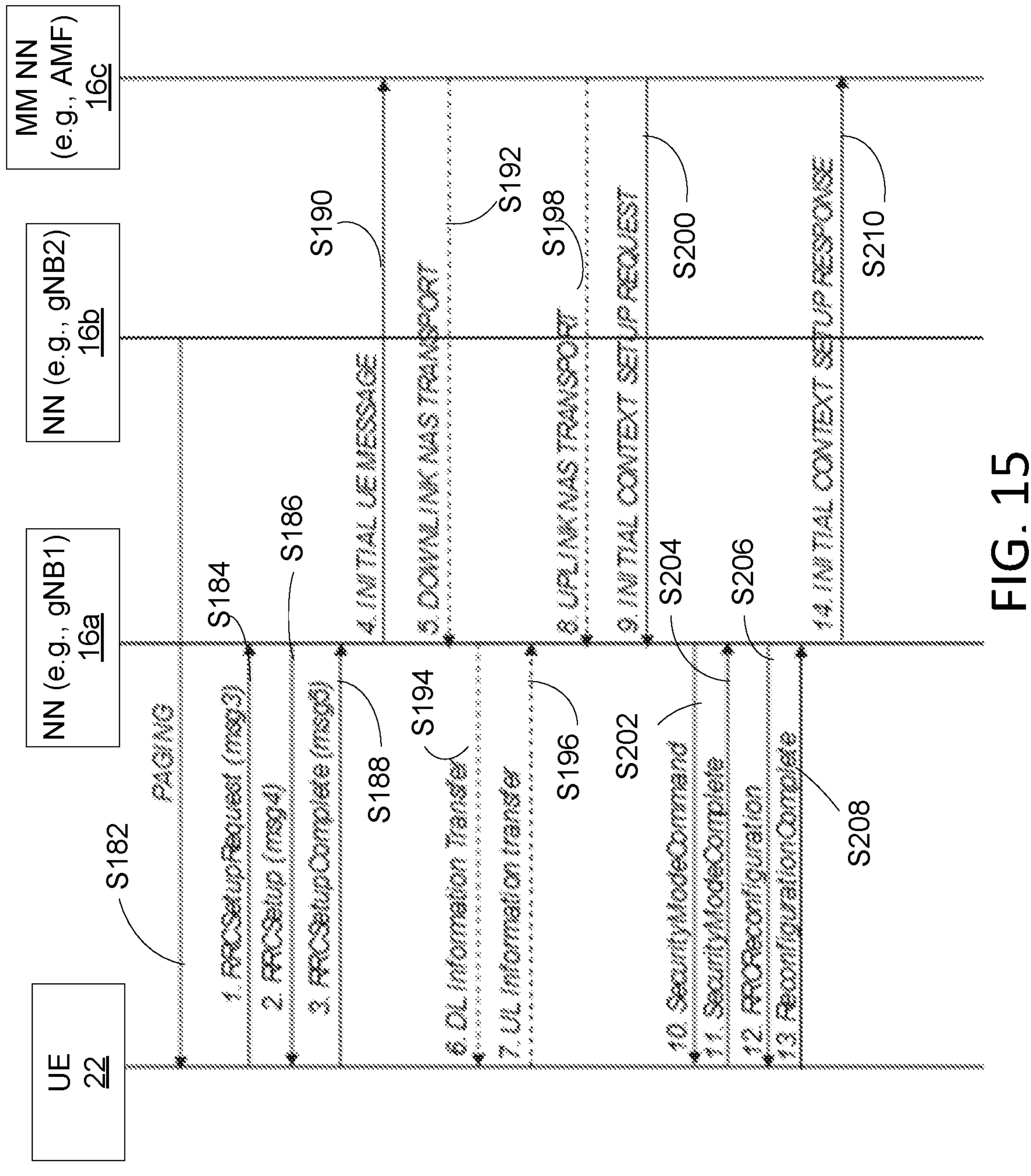
FIG. 15 illustrates an alternative signaling sequence that may be followed by the UE and gNBs.

Therefore in some embodiments, the paging information to the UE 22 includes information that allows the UE 22 to know how to respond to a received page. In particular, the UE 22 is provided with information on what frequency it should respond to a received page. Such information can be implicit or explicit. Explicit information can be added, by defining a new PagingRecord that include a frequency indication, for example an ARFCN (Absolute Radio Frequency Channel Number) or an index value indicating one of a set of frequencies on which the UE should respond. Another explicit information can be an indication on what band, (low, mid, high), the UE 22 should respond to a page. Such information, possibly in combination with earlier knowledge of exactly what frequencies a network uses on such bands, can be information enough for a UE 22 to quickly re-tune to another frequency and respond to a page, for example to another gNB. In the example of FIG. 15, the UE 22 is in RRC_IDLE and at step S182, receives a paging message from NN 16*b* (e.g., gNB2) on frequency 2, but it would respond on frequency 1 to NN 16*a* (e.g., gNB1) instead, at step S184, based on the indication in the PagingRecord.

At steps S186 and S188, the RRC setup is completed. At step S190, an initial UE message is sent and, at step S192, MM NN 16*c* sends a downlink NAS transport message. At steps S194 and S196, DL and UL information transfer occurs between the NN16*a* and UE 22. At step S198, an uplink NAS transport message is sent and, at step S200, an initial context setup request is sent to the NN 16*a*. At steps S202-S208, security mode information and RRC reconfiguration information is exchanged between the UE 22 and NN 16. At step S210, an initial context setup response message is sent to MM NN 16*c*.

An alternative explicit way of indicating that a paging response should occur on a different frequency than what a page is received on can be to associate certain paging occasions with responses on certain frequencies.

In alternative embodiments, it is not the paging record for a specific UE 22 that is changed, but rather the whole paging message. The network would then, for all paged UEs, point towards a certain frequency, such that all responses for that particular paging message would come on a different frequency (or alternatively, on the same frequency).

In one of the embodiments, a frequency indication is thus added to the PagingRecord of a specific UE 22, whereas in other embodiments, a frequency indication is added to the paging message.

As example realization of a generic paging message that indicates the inter-frequency paging is provided below. The UE 22 monitors the paging channel configured in redirectionPagingConfig to check if it is being redirected to the frequency provided in redirectedCarrierFreq. In other words, in some embodiments, paging channel information may be provided in e.g., a configuration such as the configuration IE below and an association between the paging channel and the associated inter-frequency redirection may also be provided, i.e., the paging channel information is an indication to the UE 22 that if the UE 22 is paged on the resources e.g., of the paging channel, then the UE 22 is to reselect and/or be re-directed to the frequency, X, provided in the paging channel information.

The IE DownlinkConfigCommonSIB provides common downlink parameters of a cell. This IE may be defined as follows:

```
-- ANS1START
-- TAG-DOWNLINKCONFIGCOMMONSIB-START
DownlinkConfigCommonSIB ::=                    SEQUENCE {
  frequencyInfoDL                             FrequencyInfoDL-SIB,
  initialDownlinkBWP                            BWP-DownlinkCommon,
  bcch-Config                                 BCCH-Config,
  pcch-Config                                 PCCH-Config,
  ...,
  [[
        interFreqRedirectionPcch-Config                SEQUENCE {
        redirected CarrierFreq
    ARFCN-ValueNR,
        redirectionPagingConfig
      PCCH-Config
      }
    ]]
  }
  BCCH-Config ::=                               SEQUENCE {
    modificationPeriodCoeff                       ENUMERATED {n2, n4, n8, n16},
    ...
  }
  PCCH-Config ::=                             SEQUENCE {
    defaultPagingCycle                            PagingCycle,
    nAndPagingFrameOffset                           CHOICE {
      oneT                                    NULL,
      halfT                                     INTEGER (0..1),
      quarterT                                    INTEGER (0..3),
      oneEighthT                                    INTEGER (0..7),
      oneSixteenthT                                   INTEGER (0..15),
    },
    ns                                        ENUMERATED {four, two, one},
    firstPDCCH-MonitoringOccasionOfPO         CHOICE {
      sCS15KHZoneT                                          SEQUENCE (SIZE
(1..maxPO-perPF)) OF INTEGER (0..139),
      sCS30KHZoneT-SCS15KHZhalfT                                SEQUENCE
(SIZE (1..maxPO-perPF)) OF INTEGER (0..279),
      sCS60KHZoneT-SCS30KHZhalfT-SCS15KHZquarterT
SEQUENCE (SIZE (1..maxPO-perPF)) OF INTEGER (0..559),
      sCS120KHZoneT-SCS60KHZhalfT-SCS30KHZquarterT-
SCS15KHZoneEighthT      SEQUENCE (SIZE (1..maxPO-perPF)) OF INTEGER
(0..1119),
      sCS120KHZhalfT-SCS60KHZquarterT-SCS30KHZoneEighthT-
SCS15KHZoneSixteenthT
                                              SEQUENCE (SIZE (1..maxPO-
perPF)) OF INTEGER (0..2239),
      sCS120KHZquarterT-SCS60KHZoneEighthT-SCS30KHZoneSixteenthT
SEQUENCE (SIZE (1..maxPO-perPF)) OF INTEGER (0..4479),
      sCS120KHZoneEighthT-SCS60KHZoneSixteenthT
SEQUENCE (SIZE (1..maxPO-perPF)) OF INTEGER (0..8959),
      sCS120KHZoneSixteenthT                                SEQUENCE (SIZE
(1..maxPO-perPF)) OF INTEGER (0..17919)
    } OPTIONAL,     -- Need R
    ...
  }
  -- TAG-DOWNLINKCONFIGCOMMONSIB-STOP
  -- ASN1STOP
```

In yet another embodiment, and in particular for the situation when the UE 22 is registered with more than one slice simultaneously, the paging message can include an indication of what frequency a UE 22 should respond to, not by including a frequency indication, but rather by including an indication of what service it is that paged the UE 22. The UE 22 may have received dedicated signaling information in connection to registration that associated a certain slice with a certain frequency, and from this information, it may be possible to, from a single paging message respond on the correct frequency, associate to the slice that triggered the page. One such method may be to use different identities for UEs 22 dependent on what slices that triggered the page. If a PagingRecord includes identity 1, the UE 22 will know that this is associated with slice 1, whereas if the identity 2 is signaled, the UE 22 will know that this is associated with slice 2. Dependent on dedicated information earlier received, the UE 22 may have enough information to respond on the page on the correct frequency and cell.

In some embodiments, the use of different paging occasions (PO) could refer to whether the UE 22 should use the same frequency for sending the RRCResumeRequest/RRCSetupRequest or a different frequency. For use of a different frequency, specific POa could refer to specific frequencies. The frequencies towards which the UE is redirected may be one among those inter-frequencies that are already configured for cell reselection. Such embodiments may be said to involve an "implicit" indication of the frequency on which the UE 22 is to respond to a page.

In some embodiments, the RRCResumeRequest/RRCSetupRequest sent to the second network node 16 (gNB2) could include an indication that this is a UE 22 which is being redirected from the first network node 16 (gNB1) via a direct paging message in the first network node 16.

Such an indication can be added as a specific establishment cause to the request messages, e.g., MT-access-redirected or similar indication.

Other Embodiments

Core Network Forwarding of Slice Specific Data to the Correct RAN Network Nodes

In some embodiments, the AMF/MME has visibility to one or more of the following;

1. Knowledge about which RAN node (cell) supports which slice related communication; and/or
2. Either the complete knowledge about the UE 22's current location or a prediction about the UE 22's current location. Associated to this information, is the RAN node.

In such a scenario, the AMF/mobile management entity (MME) can directly forward the slice specific data to the relevant RAN node(s) that supports the transmission of data associated with that slice that is associated with the UE 22. Also, in such a case, the AMF/MME can indicate to the RAN node in which the UE 22 is expected to be camping about the need for performing a paging with an inter-frequency redirect indication.

Inter-Frequency Cell Wakeup

In some embodiments, the first network node 16 receives a mobile terminated data related indication for paging the UE 22, and the first network node 16 realizes that the slice to which the data belongs is being served by the second network node 16 related frequencies. Also, the first network node 16 realizes that the cells on the second network node 16 related frequencies are on sleep mode and sends an indication to one or more cells on the second network node 16 related frequencies to start transmitted synchronization signals at the same time sending the paging based inter-frequency redirection to the UE 22.

Figure 16:
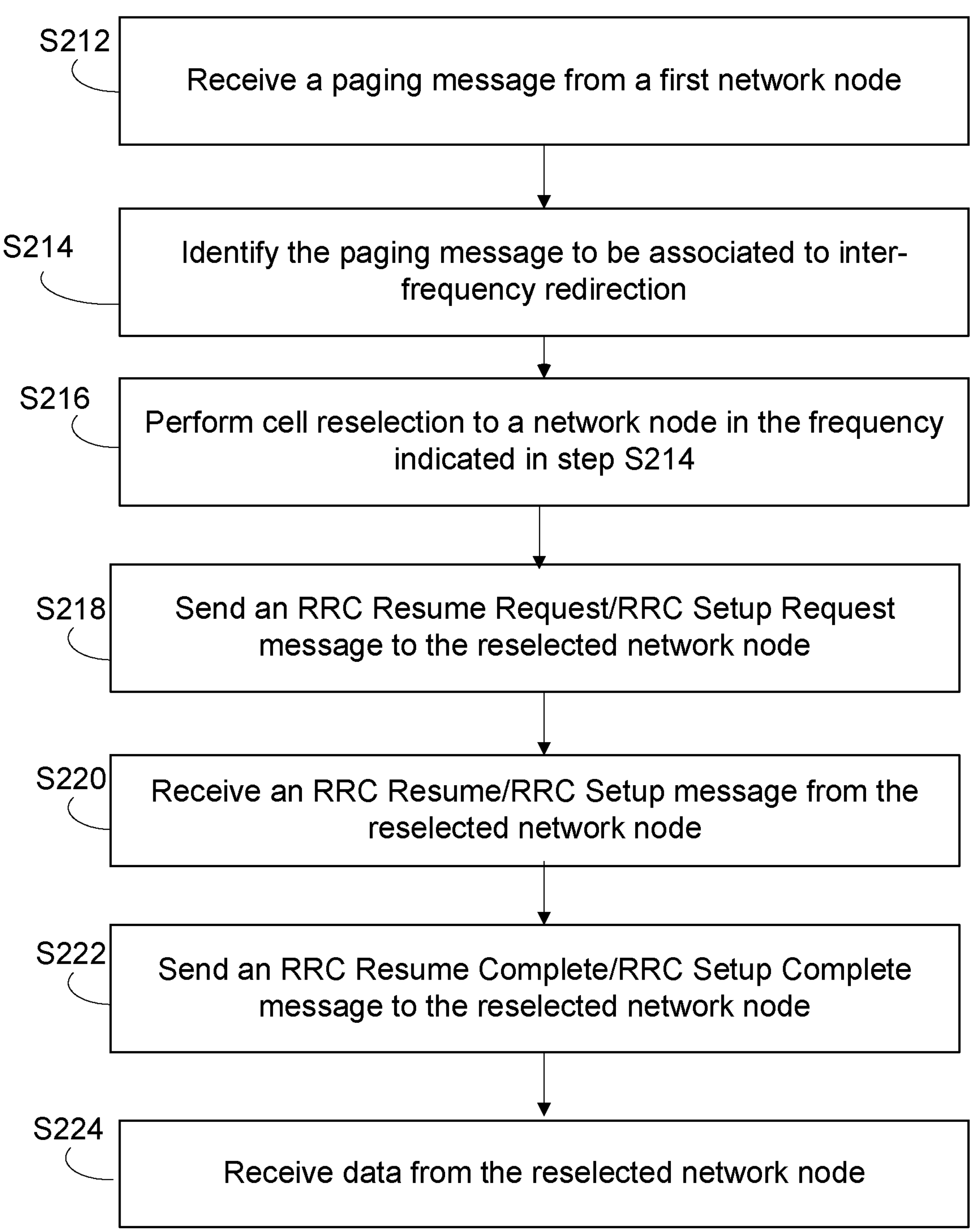
FIG. 16 is a flow diagram of an exemplary process according to some embodiments.

FIG. 16 is a flow diagram of an exemplary process according to some embodiments. The process may be implemented by UE 22. In step S212, the UE 22 receives a paging message from a first network node 16*a*. The UE 22 can then (step S214) identify that the paging message is associated with an inter-frequency re-direction, i.e., a response to the page should be sent on another frequency. In step S216, the UE 22 performs a cell reselection to a network node 16*b* on the frequency indicated in step S214. In step S218, the UE 22 may send a request for an RRC connection; either a resume request if the UE 22 was paged via RAN paging for example, or a setup request if the UE 22 was paged in RRC_IDLE. In step S220, the UE 22 may receive the response to the request message, including for example, radio bearer configurations that the UE 22 should use. The UE 22 may respond with a complete message in step S222 and subsequent to this, (possibly following NAS signaling), it may be possible to start to receive data in step S224 from the network via the network node 16*b*.

Figure 17:
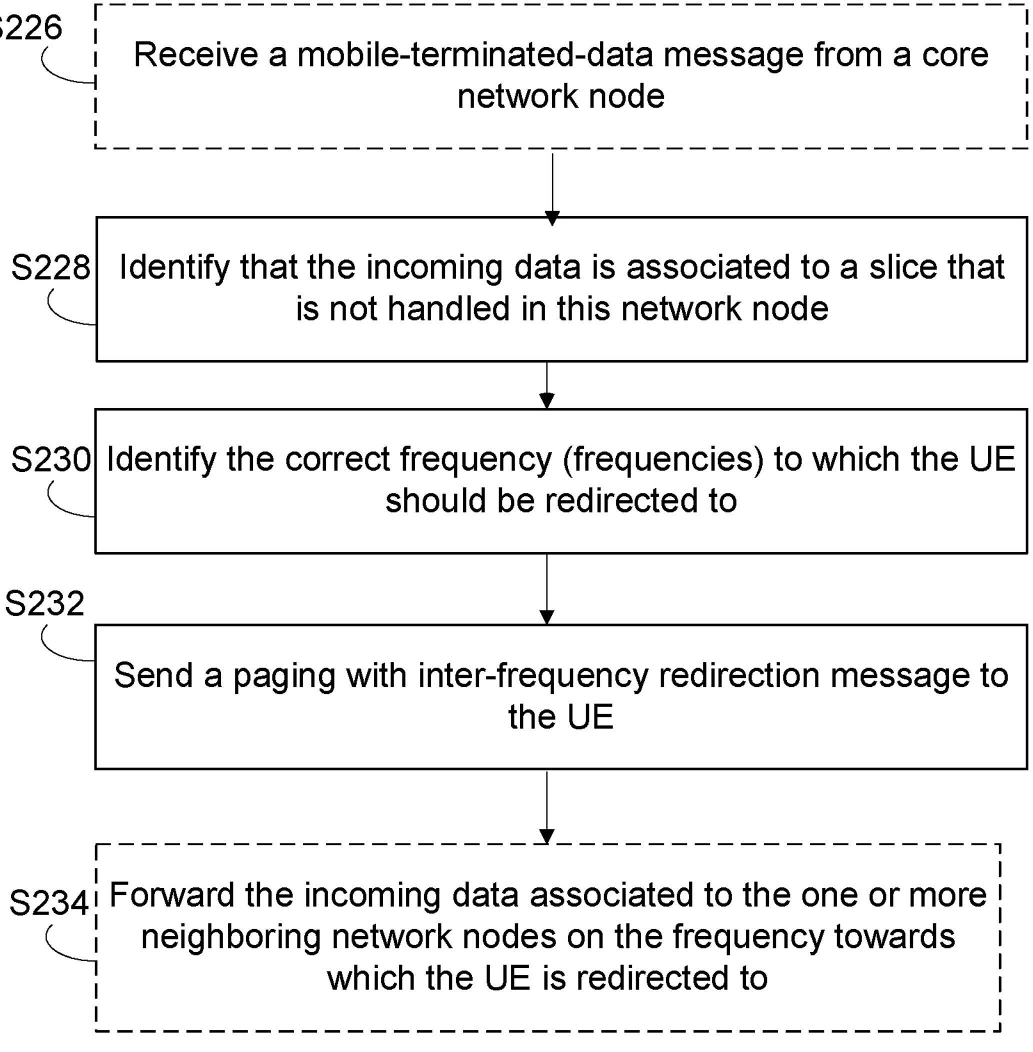
FIG. 17 is another flow diagram applicable for a first network node.

FIG. 17 is another flow diagram applicable for a first network node 16*a*. The process may be implemented by the first network node 16*a*, which may be a current network node associated with the UE 22. In optional step S226, the first network node 16*a* receives a mobile-terminated data message from a core network node. The first network node 16*a* then, in step S228, identifies the data and an associated slice that is not handled in the current network node, or at least that it is handled on a specific frequency. Further, the first network node 16*a* would, in step S230, identify the correct frequency to which the UE 22 should be redirected, and the first network node 16*a* would then send the paging message with the inter-frequency redirection (step S232). Subsequent to this, the first network node 16*a* forwards the incoming data associated to the neighboring network node 16*b* on the frequency towards which the UE 22 is redirected (Optional Step S234). Step S230 can, for example, be based on information that is gathered on relationships between the first network node16*a* and other neighboring network nodes 16*b*. Neighboring network nodes 16*b* for which there is an Xn connection would have configuration update information including slice information.

In some alternatives to the flow diagram of FIG. 17, the network node would, instead of forward incoming data to neighboring network nodes, a neighboring network node triggers a path switch, such that data comes directly to the network node that serves the UE.

Figure 18:
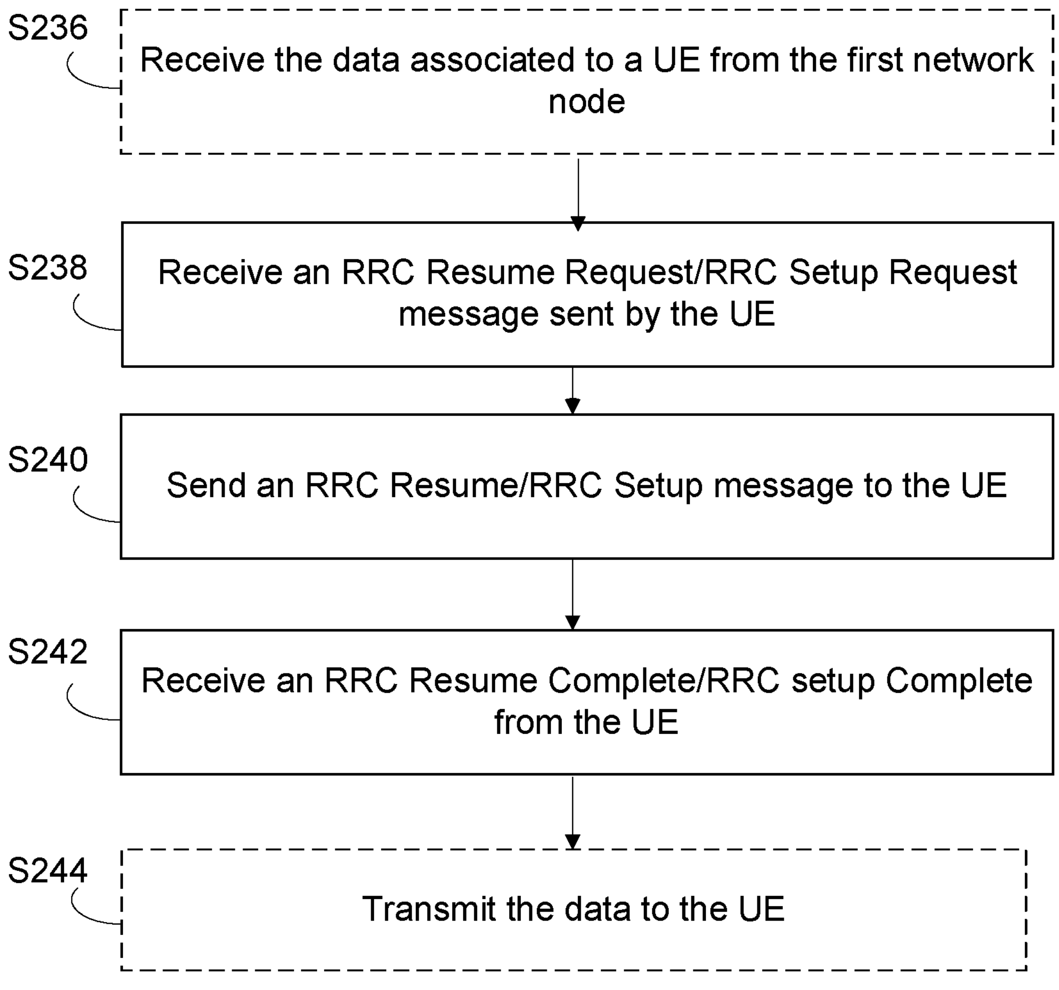
FIG. 18 is a flow diagram for a first network node that serves the UE.

A flow diagram for a second network node 16*b* to which the UE 22 is redirected is illustrated in FIG. 18. In step S236, a second network node 16*b* may receive data from the first network node 16*a* and then, it would connect this data to an incoming resume request or setup request in step S238. The second network node 16*b* then sends a response to the UE 22 (resume or setup) in step S240 and receives the complete message in step S242, after which it can start to send data to the UE 22 in step S244. An alternative to the above is to not act at all before a resume request is received in the second network node 16*b*.

Figure 19:
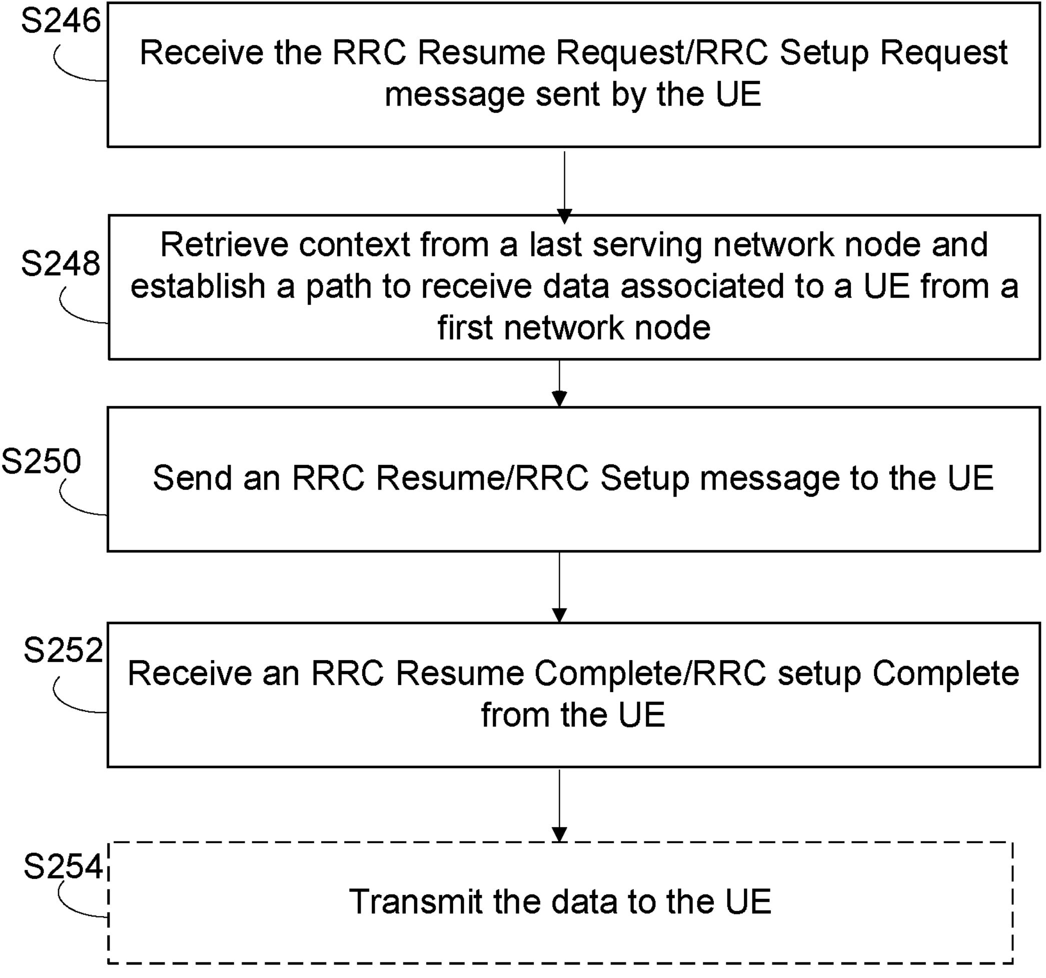
FIG. 19 is a flow diagram of an alternative process for a first network node that serves the UE.

An alternative process is shown in FIG. 19. The process may be implemented by a second network node 16*b* to which the UE 22 is redirected. In step S246 the RRSResumeRequest/RRCSetupRequest message is received from the UE 22. In step S248, the context is retrieved from the last serving network node 16*a* and a path is established to receive data associated with the UE 22 from the first network node 16*a*. In step S250, the RRCResume/RRCSetup message is sent to the UE 22. In step S252, the RRCResumeComplete/RRCSetupComplete message is received from the UE 22. In step S254, data is transmitted to the UE 22.

According to one aspect, a network node 16 configured to communicate with a user equipment (UE) 22, includes a radio interface 62 and/or processing circuitry 68 configured to generate a paging message directing the UE 22 to switch to a first frequency on which to perform an RRCResume/RRCSetup procedure, and send the paging message to the UE 22 on a second frequency.

According to this aspect, in some embodiments, the network node 16 and/or the radio interface 62 and/or the processing circuitry 68 are further configured to activate a connection causing the UE 22 to transition to a connected state. In some embodiments, the paging message indicates a service that paged the UE 22. In some embodiments, the paging message to the UE 22 indicates the first frequency.

According to another aspect, a method implemented in a network node 16 includes generating a paging message directing the UE 22 to switch to a first frequency on which to perform an RRCResume/RRCSetup procedure, and sending the paging message to the UE 22 on a second frequency.

According to this aspect, in some embodiments, the method further includes activating, via the processing circuitry 68, a connection causing the UE 22 to transition to a connected state. In some embodiments, the paging message indicates a service that paged the UE 22. In some embodiments, the paging message to the UE 22 indicates the first frequency.

According to yet another aspect, a UE 22 configured to communicate with a network node 16, includes a radio interface 82 and/or processing circuitry 84 configured to receive a paging message from the network node 16 on a first frequency, the paging message directing the UE 22 to switch to a second frequency, and perform an RRCResume/RRCSetup procedure on the second frequency.

According to this aspect, in some embodiments, the UE 22 and/or the radio interface 82 and/or the processing circuitry 84 are further configured to receive a trigger and in response to the received trigger, switch to a connected state. In some embodiments, the paging message indicates a service that paged the UE 22. In some embodiments, the paging message to the UE 22 indicates the second frequency.

According to another aspect, a method implemented in a user equipment (UE) includes receiving a paging message from the network node 16 on a first frequency, the paging message directing the UE 22 to switch to a second frequency, and performing an RRCResume/RRCSetup procedure on the second frequency.

According to this aspect, in some embodiments, the method further includes receiving a trigger and in response to the received trigger, switching to a connected state. In some embodiments, the paging message indicates a service that paged the UE 22. In some embodiments, the paging message to the UE 22 indicates the second frequency.

Some embodiments may include one or more of the following:

Embodiment A1. A network node configured to communicate with a user equipment (UE), the network node configured to, and/or comprising a radio interface and/or comprising processing circuitry configured to:

generate a paging message directing the UE to switch to a first frequency on which to perform an RRCResume/RRCSetup procedure; and send the paging message to the UE on a second frequency.

Embodiment A2. The network node of Embodiment A1, wherein the network node and/or the radio interface and/or the processing circuitry are further configured to activate a connection causing the UE to transition to a connected state.

Embodiment A3. The network node of any of Embodiments A1 and A2, wherein the paging message indicates a service that paged the UE.

Embodiment A4. The network node of any of Embodiments A1-A3, wherein the paging message to the UE indicates the first frequency.

Embodiment B1. A method implemented in a network node, the method comprising:

generating a paging message directing the UE to switch to a first frequency on which to perform an RRCResume/RRCSetup procedure; and sending the paging message to the UE on a second frequency.

Embodiment B2. The method of Embodiment B1, further comprising activating a connection causing the UE to transition to a connected state.

Embodiment B3. The method of any of Embodiments B1 and B2, wherein the paging message indicates a service that paged the UE.

Embodiment B4. The method of any of Embodiments B1-B3, wherein the paging message to the UE indicates the first frequency.

Embodiment C1. A user equipment (UE) configured to communicate with a network node, the UE configured to, and/or comprising a radio interface and/or processing circuitry configured to:

receive a paging message from the network node on a first frequency, the paging message directing the UE to switch to a second frequency; and perform an RRCResume/RRCSetup procedure on the second frequency.

Embodiment C2. The UE of Embodiment C1, wherein the UE and/or the radio interface and/or the processing circuitry are further configured to receive a trigger and in response to the received trigger, switch to a connected state.

Embodiment C3. The UE of any of Embodiments C1 and C2, wherein the paging message indicates a service that paged the UE.

Embodiment C4. The UE of any of Embodiments C1-C3, wherein the paging message to the UE indicates the second frequency.

Embodiment D1. A method implemented in a user equipment (UR), the method comprising:

receiving a paging message from the network node on a first frequency, the paging message directing the UE to switch to a second frequency; and performing an RRCResume/RRCSetup procedure on the second frequency.

Embodiment D2. The method of Embodiment D1, further comprising receiving a trigger and in response to the received trigger, switching to a connected state.

Embodiment D3. The method of any of Embodiments D1 and D2, wherein the paging message indicates a service that paged the UE.

Embodiment D4. The method of any of Embodiments D1-D3, wherein the paging message to the UE indicates the second frequency.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a user equipment, UE, configured to communicate with a network node, the method comprising:

receiving a paging message from the network node on a first frequency, the paging message indicating a frequency band to be used by the UE to respond to the paging message, the frequency band having a set of frequencies;

selecting a second frequency from the set of frequencies in the indicated frequency band, the first frequency being associated with a first slice and the second frequency being associated with a second slice; and responding, to another network node via message 3, msg3, to the paging message on the second frequency.

2. The method of claim 1, wherein one or more of:

the UE is simultaneously registered to the first and second slices;

the UE is camped on the first frequency;

the first slice associated with the first frequency supports a first service and the second slice associated with the second frequency supports a second service; and one of the first and second services is ultra-reliable low latency communication, URLLC and another of the first and second services is enhanced mobile broadband, eMBB.

3. The method of claim 1, wherein the paging message indicates a service that paged the UE.

4. The method of claim 1, wherein the paging message indicates the second frequency.

5. The method of claim 4, wherein the paging messages comprises a paging record, the paging record comprising a frequency indication indicating the second frequency.

6. The method of claim 4, wherein the second frequency is indicated by an absolute radio frequency channel number, ARFCN.

7. The method of claim 4, wherein the second frequency is indicated by an index value.

8. A user equipment, UE, configured to communicate with a network node, the UE comprising processing circuitry, the processing circuitry configured to cause the UE to:

receive a paging message from the network node on a first frequency, the paging message indicating a frequency band to be used by the UE to respond to the paging message, the frequency band having a set of frequencies;

select a second frequency from the set of frequencies in the indicated frequency band, the first frequency being associated with a first slice and the second frequency being associated with a second slice; and respond, to another network node via message 3, msg3, to the paging message on the second frequency.

9. The UE of claim 8, wherein one or more of:

the UE is simultaneously registered to the first and second slices;

the UE is camped on the first frequency;

the first slice associated with the first frequency supports a first service and the second slice associated with the second frequency supports a second service; and one of the first and second services is ultra-reliable low latency communication, URLLC and another of the first and second services is enhanced mobile broadband, eMBB.

10. The UE of claim 8, wherein the paging message indicates a service that paged the UE.

* * * * *